(12) United States Patent
Hebert et al.

(10) Patent No.: US 12,545,168 B2
(45) Date of Patent: Feb. 10, 2026

(54) WORK IMPLEMENT TILT CONTROL SYSTEM AND METHOD FOR TRACKED VEHICLE

(71) Applicant: Prinoth Ltd., St. John (CA)

(72) Inventors: Patrick Hebert, Granby (CA); Eric Steben, Granby (CA); Simon Filion, Granby (CA); Eric Tremblay, Granby (CA)

(73) Assignee: Prinoth Ltd., St. John (CA)

( * ) Notice: Subject to any disclaimer, the term of this patent is extended or adjusted under 35 U.S.C. 154(b) by 842 days.

(21) Appl. No.: 17/755,290

(22) PCT Filed: Oct. 29, 2020

(86) PCT No.: PCT/CA2020/051463
§ 371 (c)(1),
(2) Date: Apr. 26, 2022

(87) PCT Pub. No.: WO2021/081655
PCT Pub. Date: May 6, 2021

(65) Prior Publication Data
US 2022/0396191 A1 Dec. 15, 2022

Related U.S. Application Data

(60) Provisional application No. 62/927,962, filed on Oct. 30, 2019.

(51) Int. Cl.
*B60P 1/28* (2006.01)
*B60P 1/16* (2006.01)
*E02F 9/22* (2006.01)

(52) U.S. Cl.
CPC .............. *B60P 1/283* (2013.01); *B60P 1/16* (2013.01); *E02F 9/2228* (2013.01)

(58) Field of Classification Search
CPC ... B60P 1/283; B60P 1/16; B60P 1/045; E02F 9/2228; E02F 9/123; E02F 9/265; B62D 55/06
See application file for complete search history.

(56) References Cited

U.S. PATENT DOCUMENTS 3,245,488 A    4/1966   Peterson
5,452,942 A * 9/1995   Brooks .................. B60P 1/162
                                                   298/22 C (Continued)

FOREIGN PATENT DOCUMENTS

CA    2679780     4/2010
CA    3112145 C   11/2022

(Continued)

OTHER PUBLICATIONS

WO, Int. App. No. PCT/CA2020/051463, International Report on Patentability, 9 pages, May 3, 2022.

(Continued)

*Primary Examiner* — Anne Marie Antonucci
*Assistant Examiner* — Patrick Daniel Mohl
(74) *Attorney, Agent, or Firm* — Woodard, Emhardt, Henry, Reeves & Wagner, LLP

(57) ABSTRACT

A work implement tilt control system for a tracked vehicle having a frame and a work implement mounted to the frame, the system comprising: a lifting unit configured to controllably raise or lower at least part of the work implement; an input device actionable by a first and second types of external actions associated with raising or lowering of the work implement; and a vehicle computer configured to send a signal to the lifting unit to carry out a lowering cycle of the work implement in case the vehicle computer determines that a set of conditions has been met. In some cases, the set of conditions includes: (i) a movement characteristic of the tracked vehicle exceeds a threshold; and (ii) the input device (Continued)

has been actioned by the first type of external action since carrying out the most recent lowering cycle of the work implement.

46 Claims, 27 Drawing Sheets

(56) References Cited

U.S. PATENT DOCUMENTS

| | | | |
|---|---|---|---|
| 5,632,350 | A | 5/1997 | Gauvin |
| 6,007,166 | A | 12/1999 | Tucker et al. |
| 6,129,426 | A | 10/2000 | Tucker |
| 6,336,558 | B1 | 1/2002 | Douglas |
| 9,212,466 | B2 | 12/2015 | Yokota et al. |
| 11,498,469 | B2* | 11/2022 | Wink .................. B60P 1/267 |
| 2001/0007234 | A1 | 7/2001 | Scheetz |
| 2008/0208416 | A1 | 8/2008 | Yuet et al. |
| 2009/0196722 | A1* | 8/2009 | Anderson ............ B62D 53/023 701/50 |
| 2010/0045093 | A1 | 2/2010 | Foisie |
| 2010/0084908 | A1 | 4/2010 | Montocchio |
| 2010/0231025 | A1* | 9/2010 | Wagner .............. B62D 49/0678 180/9.1 |
| 2010/0327649 | A1* | 12/2010 | Kvist .................. B60P 1/283 298/17 S |
| 2015/0355646 | A1* | 12/2015 | Mochizuki ......... G05D 16/2066 298/22 C |
| 2015/0361640 | A1* | 12/2015 | Faivre .................. E02F 3/436 701/50 |
| 2016/0264032 | A1* | 9/2016 | Terada ................. G07C 5/0808 |
| 2018/0111537 | A1 | 4/2018 | Baldys et al. |
| 2019/0009702 | A1* | 1/2019 | Itai .......................... F15B 11/20 |
| 2019/0242092 | A1 | 8/2019 | Peloquin et al. |
| 2020/0039432 | A1* | 2/2020 | Lemieux ................. B60Q 9/00 |
| 2022/0396191 | A1 | 12/2022 | Hebert et al. |
| 2022/0410856 | A1* | 12/2022 | Wink .................. B60T 8/17551 |

FOREIGN PATENT DOCUMENTS

| | | |
|---|---|---|
| CA | 3171952 C | 8/2023 |
| CN | 102410042 | 4/2012 |
| CN | 106427727 | 2/2017 |
| GB | 2545452 A | 6/2017 |
| JP | 2001097105 A | 4/2001 |
| JP | H08268136 A | 3/2002 |
| JP | 2011194950 | 10/2011 |
| JP | 7590423 B2 | 11/2024 |
| WO | 2011067652 | 6/2011 |
| WO | 2018014133 A1 | 1/2018 |
| WO | 2021012030 | 1/2021 |
| WO | 2021081655 A1 | 5/2021 |

OTHER PUBLICATIONS

CA, App. No. 3112145, Notice of Allowance, 1 page, Jun. 17, 2022.
CA, App. No. 3171952, Examiners Report, 4 pages, Dec. 9, 2022.
CA, App. No. 3171952, Notice of Allowance, 1 page, Feb. 23, 2023.
JP, App. No. 2022-521006, Office Action, 8 pages, Oct. 24, 2023.
EP, App. No. 20880944.2, European Search Report, 8 pages, Oct. 24, 2023.
EP, App. No. 20880944.2, Communication Under Rules 70(2) and 70a(2), 1 page, Nov. 10, 2023.
JP, App. No. 2022-521006, Decision to Grant, 3 pages, Nov. 5, 2024.
Written Opinion and International Search Results issued by WIPO in connection with PCT/CA2019/050999 on Apr. 7, 2020, 7 pages.
Written Opinion and International Search Results issued by WIPO in connection with PCT/CA2020/051463 on Jan. 15, 2021, 13 pages.

* cited by examiner

68

Joystick maneuver dump box response
1710

FIG. 17A

Lowering sequence segment

| X | Y | Z | W |

WORK IMPLEMENT TILT CONTROL SYSTEM AND METHOD FOR TRACKED VEHICLE

CROSS-REFERENCE TO RELATED APPLICATION

The present application claims the benefit under 35 U.S.C. 119(e) of U.S. Provisional Application Ser. No. 62/927,962, filed on Oct. 30, 2019, hereby incorporated by reference herein.

FIELD

The present disclosure relates to tracked vehicles in general and, more specifically, to a tilt control system for a work implement, such as a dump box, of a tracked vehicle.

BACKGROUND

A tracked dumper is a tracked vehicle with a dump box that can be tilted to release its contents onto the ground. It is recognized that moving the vehicle while the dump box is tilted can be hazardous and may damage both the frame of the vehicle and the dump box. Therefore, it is common practice to require operators to fully lower the dump box before moving the vehicle. A manual controller (e.g., a joystick) can be typically used to safely raise and lower the dumper.

However, it may happen that the dumper moves forward while the dump box is partly raised. For example, the operator may accidentally displace the joystick with his/her hand or jacket when performing other maneuvers in the cab. In other cases, the operator may simply forget to fully lower the dump box. If either scenario were to occur, and the operator begins driving the vehicle, believing (mistakenly) that the dump box is fully lowered, damage may ensue. In particular, the stress forces on the frame of the vehicle may cause the frame to warp, even if the dumper remains raised by only a few millimeters or fractions of a degree. The faster the operator drives the vehicle, the greater the resulting forces and the greater the chances of damage to the frame, with long-lasting and expensive consequences. This can be an especially serious problem with tracked vehicles whose chassis are narrower than those of wheeled vehicles due to the width of the tracks. Therefore, it would be desirable to provide a vehicle with a feature that can help prevent damage in scenarios such as those described above.

SUMMARY

According to a first broad aspect, there is provided a work implement tilt control system for a tracked vehicle having a frame and a work implement mounted to the frame, the work implement tilt control system comprising: a lifting unit for connection to the frame and to the work implement, the lifting unit being configured to controllably raise or lower at least part of the work implement; an input device actionable by a first type of external action associated with an attempt to raise the work implement and by a second type of external action associated with an attempt to lower the work implement; and a vehicle computer configured to send a signal to the lifting unit to carry out a lowering cycle of the work implement in case the vehicle computer determines that a set of conditions has been met, wherein the set of conditions includes: (i) a movement characteristic of the tracked vehicle exceeds a threshold; and (ii) the input device has been actioned by the first type of external action since carrying out the most recent lowering cycle of the work implement.

According to a second broad aspect, there is provided a work implement tilt control system for a tracked vehicle having a frame and a work implement mounted to the frame, the work implement tilt control system comprising: a lifting unit for connection to the frame and to the work implement, the lifting unit being configured to controllably raise or lower at least part of the work implement; an input device configured to produce a signal indicative of an external action on the input device, the external action being associated with an attempt to raise or lower the work implement; and a vehicle computer configured to send a signal to the lifting unit to carry out a lowering cycle of the work implement based at least on an open-loop tilt angle of the work implement, the open-loop tilt angle being computed by monitoring the signal produced by the input device.

According to a third broad aspect, there is provided a work implement tilt control system for a tracked vehicle having a frame and a work implement mounted to the frame, the work implement tilt control system comprising: a lifting unit for connection to the frame and to the work implement, the lifting unit being configured to controllably change a tilt angle of the work implement; a vehicle computer configured to send a signal to the lifting unit to carry out a lowering cycle of the work implement in case the vehicle computer determines that a set of conditions has been met, wherein the set of conditions includes: (i) a movement characteristic of the tracked vehicle exceeds a first non-zero threshold; and (ii) the tilt angle of the work implement exceeds a second non-zero threshold.

According to a fourth broad aspect, there is provided a work implement tilt control system for a tracked vehicle having a frame and a work implement mounted to the frame, the work implement tilt control system comprising: a lifting unit for connection to the frame and to the work implement, the lifting unit being configured to controllably raise or lower at least part of the work implement; a user interface comprising (i) an input device configured to produce a signal indicative of an external action on the input device, the external action being associated with an attempt to raise or lower the work implement; and (ii) an output capable of acquiring a plurality of states; and a vehicle computer configured to send a signal to the lifting unit to carry out a lowering cycle of the work implement in case the vehicle computer determines that a set of predetermined conditions has been met, the vehicle computer being further configured to cause the user interface to change the state of the output from a first state to a second state upon starting the lowering cycle, to change the state of the output from the second state to a third state upon completion of the lowering cycle, and to change the state of the output from the third state to the first state upon the condition having been met but the next lowering cycle not yet having begun.

According to a further aspect, there is provided a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement and the work implement tilt control system also comprising an input device actionable by a first type of external action associated with an attempt to raise the work implement and by a second type of external action associated with an attempt to lower the work implement, wherein the method comprises: (i) determining if a set of conditions has been met; and (ii) in case the set of conditions has been met, sending a signal to the lifting unit to carry out a lowering cycle of the work implement; wherein the set of conditions includes: a movement characteristic of the tracked vehicle exceeds a threshold; and the input device has been actioned by the first type of external action since carrying out the most recent lowering cycle of the work implement.

According to a further aspect, there is provided a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement and the work implement tilt control system also comprising an an input device configured to produce a signal indicative of an external action on the input device, the external action being associated with an attempt to raise or lower the work implement, wherein the method comprises: (i) a vehicle computer configured to send a signal to the lifting unit to carry out a lowering cycle of the work implement based at least on an open-loop tilt angle of the work implement, the open-loop tilt angle being computed by monitoring the signal produced by the input device; (ii) monitoring the signal produced by the input device; (iii) computing an open-loop tilt angle of the work implement from the signal produced by the input device; and (iv) sending a signal to the lifting unit to carry out a lowering cycle of the work implement based at least on the open-loop tilt angle of the work implement.

According to a further aspect, there is provided a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably change a tilt angle of the work implement, wherein the method comprises: (i) determining if a set of conditions has been met; and (ii) in case the set of conditions has been met, sending a signal to the lifting unit to carry out a lowering cycle of the work implement; wherein the set of conditions includes: a movement characteristic of the tracked vehicle exceeds a first non-zero threshold; and the tilt angle of the work implement exceeds a second non-zero threshold.

According to a further aspect, there is provided a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement; the work implement tilt control system also comprising a user interface comprising (i) an input device configured to produce a signal indicative of an external action on the input device, the external action being associated with an attempt to raise or lower the work implement; and (ii) an output capable of acquiring a plurality of states, wherein the method comprises: (i) determining that a condition has been met,; (ii) in case the condition has been met, sending a signal to the lifting unit to carry out a lowering cycle of the work implement; and (iii) in case the condition having been met and the next lowering cycle has not yet begun, causing the user interface to change the state of the output from a first state to a second state upon starting the lowering cycle, to change the state of the output from the second state to a third state upon completion of the lowering cycle, and to change the state of the output from the third state to the first state.

According to other broad aspects, there is provided a computer-readable medium storing computer readable instructions which, when executed by a processor, cause the processor to carry out the various methods disclosed herein.

BRIEF DESCRIPTION OF THE DRAWINGS

A detailed description of embodiments is provided below, by way of example only, with reference to drawings accompanying this description, in which:

FIG. 17A conceptually illustrates a relationship between a joystick maneuver and a dump box response, as may be stored in a memory, in accordance with a non-limiting embodiment.

FIG. 17B conceptually illustrates a lowering cycle comprising segments, as may be stored in a memory, in accordance with a non-limiting embodiment.

DETAILED DESCRIPTION

Structure of Vehicle

Figure 1A:
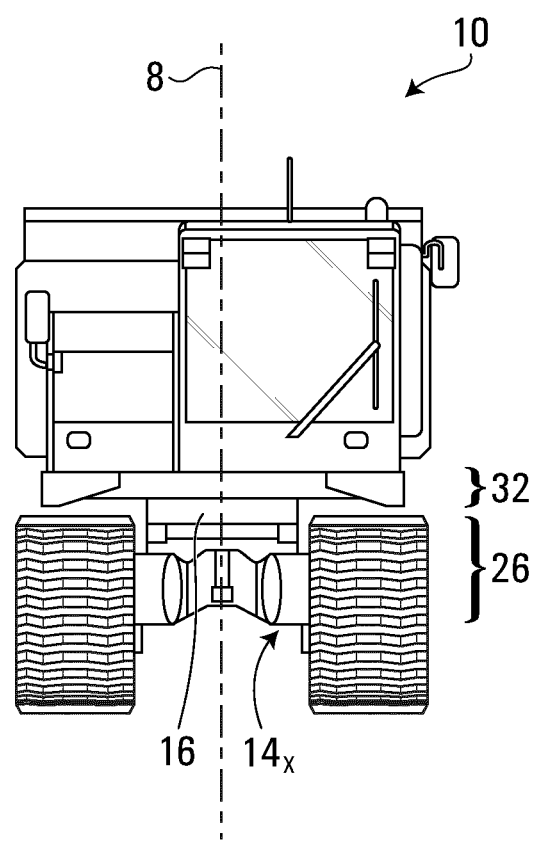
FIGS. 1A and 1B are front and side elevational views, respectively, of an embodiment of a tracked vehicle comprising an upper and lower frame structure, in accordance with a non-limiting embodiment.
Figure 1B:
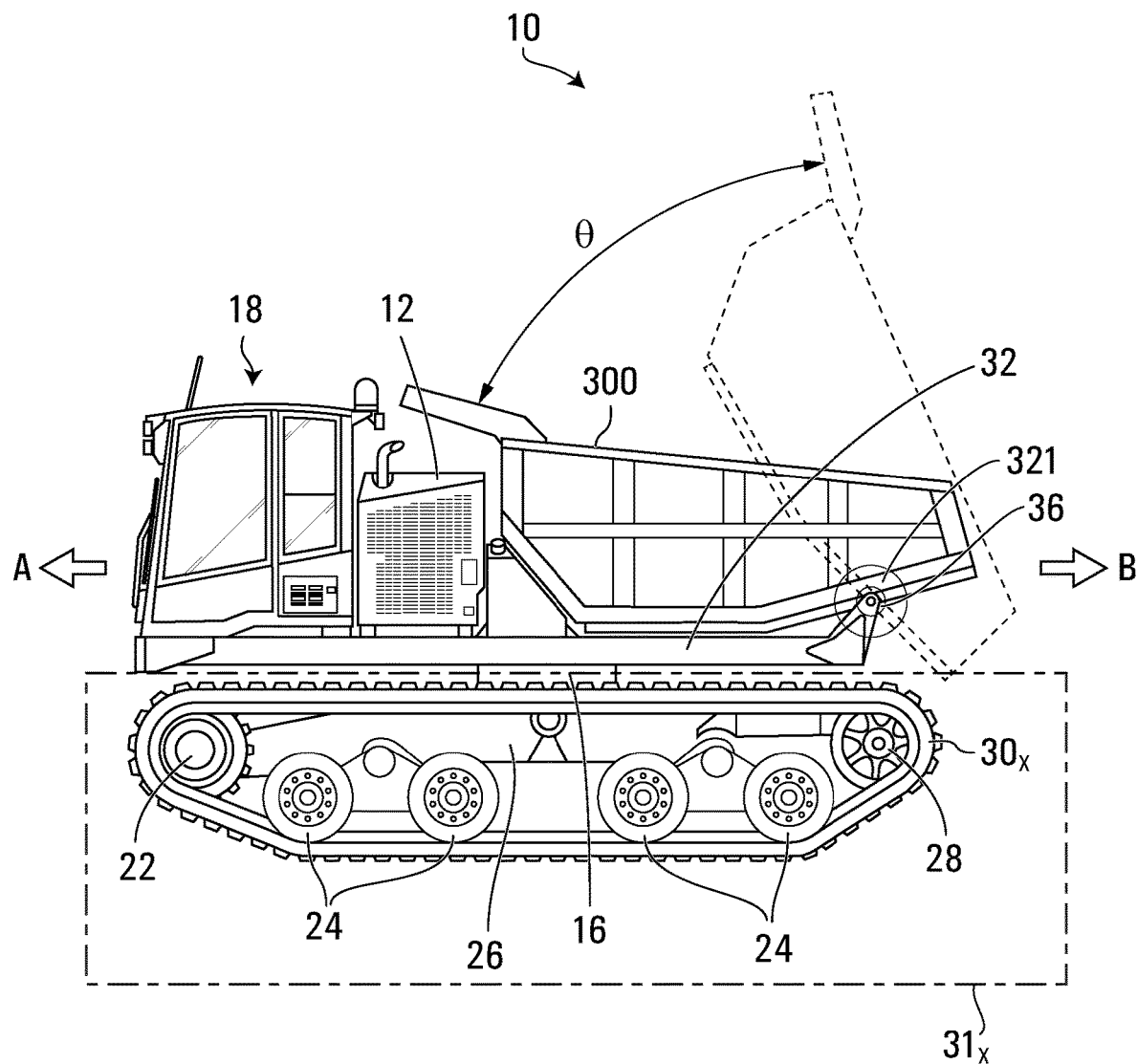
Figure 1C:
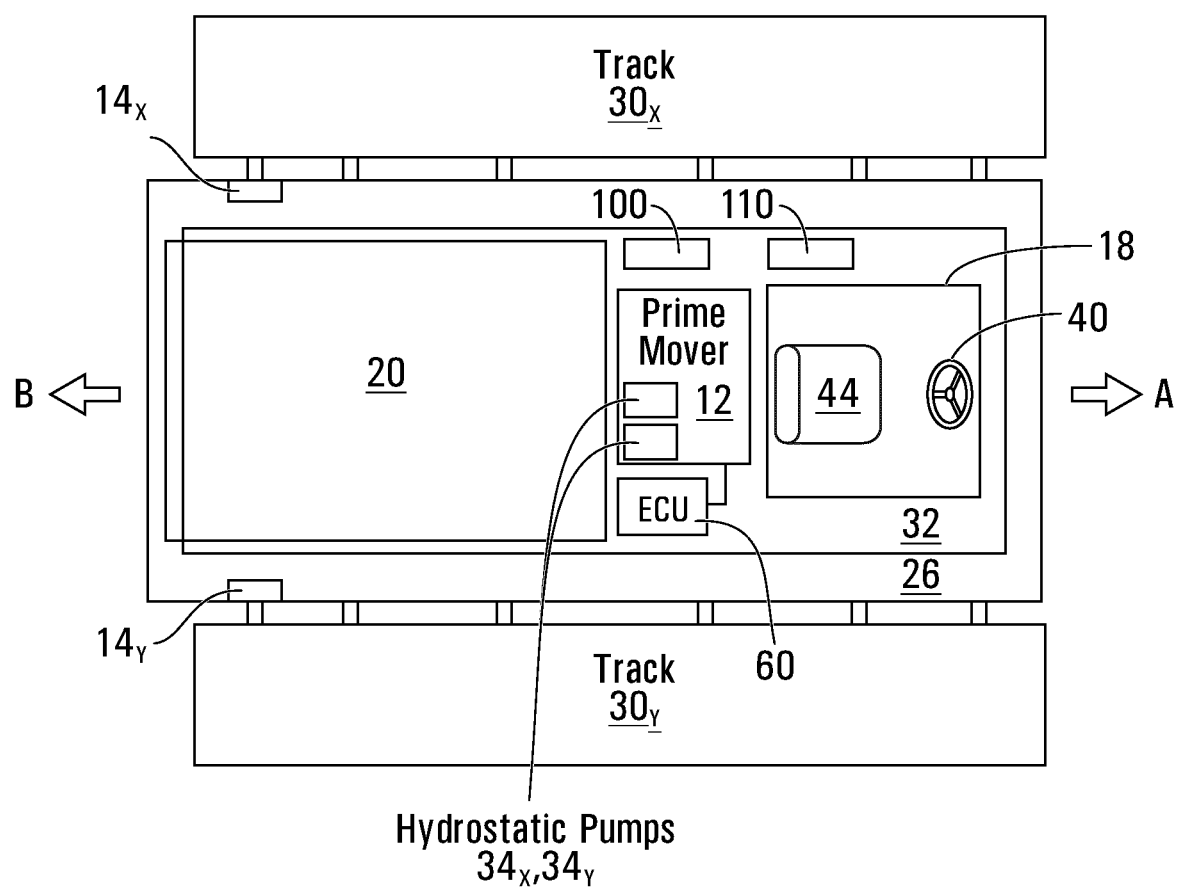
FIG. 1C is a conceptual top view of an embodiment of a tracked vehicle, in accordance with a non-limiting embodiment.

With reference to FIGS. 1A, 1B, 1C, 1D and 20, there is shown a tracked vehicle 10 in accordance with a non-limiting embodiment of the present invention. The tracked vehicle 10 includes a body or frame comprising a lower structure 26 (sometimes referred to as a lower frame structure) and an upper structure 32 (sometimes referred to as an upper frame structure). In this embodiment, the upper structure 32 is rotatable relative to the lower structure 26 about an axis 8 (see FIG. 5). In other embodiments, the upper and lower structures 32, 26 may form a single frame structure that is not rotatable in the above described manner.

Figure 21A:
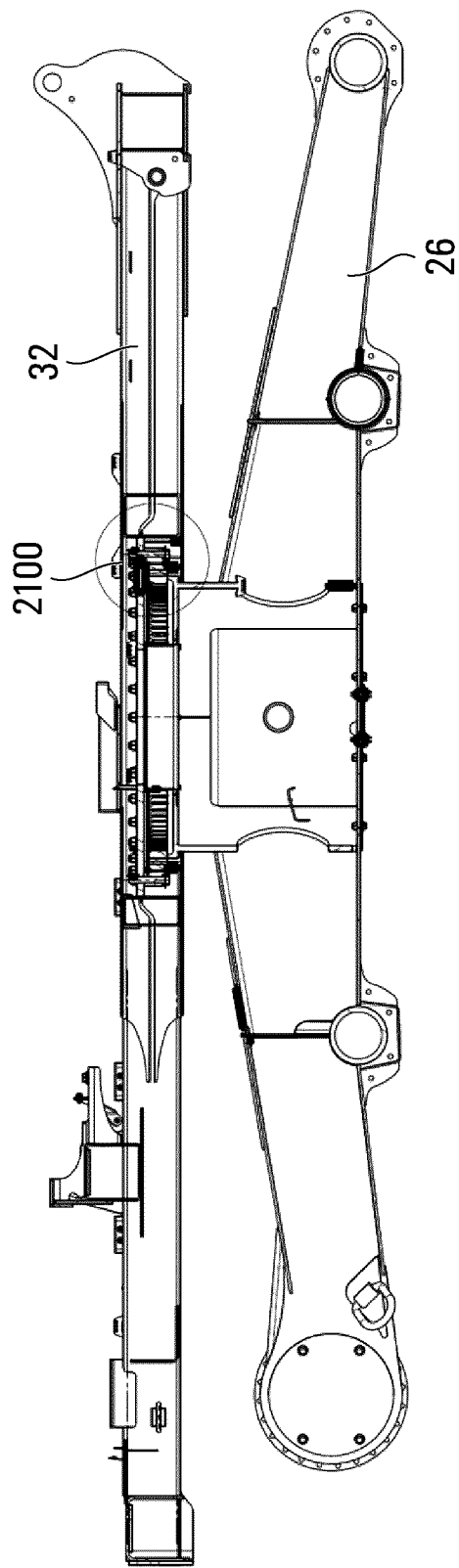
FIGS. 21A to 21C are increasingly close-up cross-sectional side views of an example bearing that connects the upper frame structure to the lower frame structure and allows relative rotation thereof.
Figure 21B:
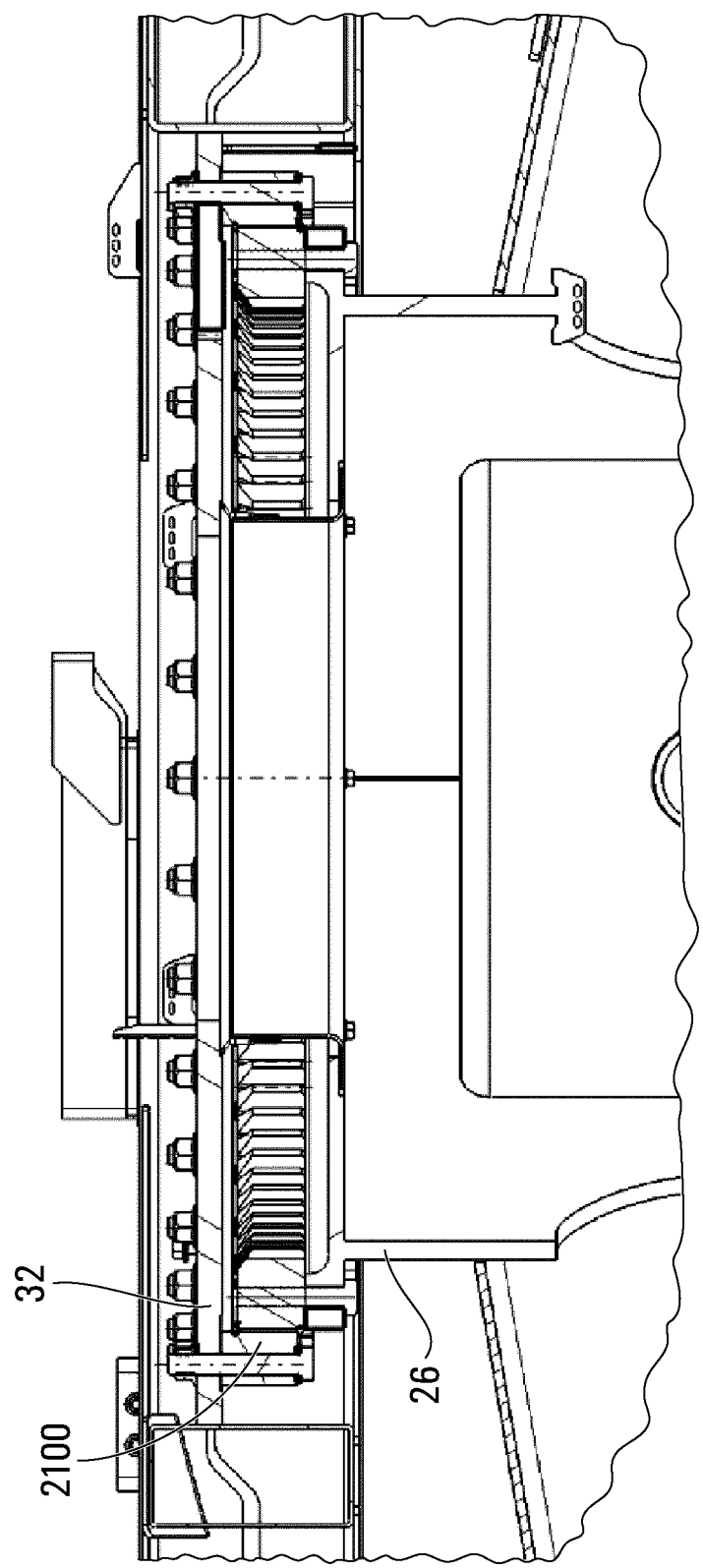
Figure 21C:
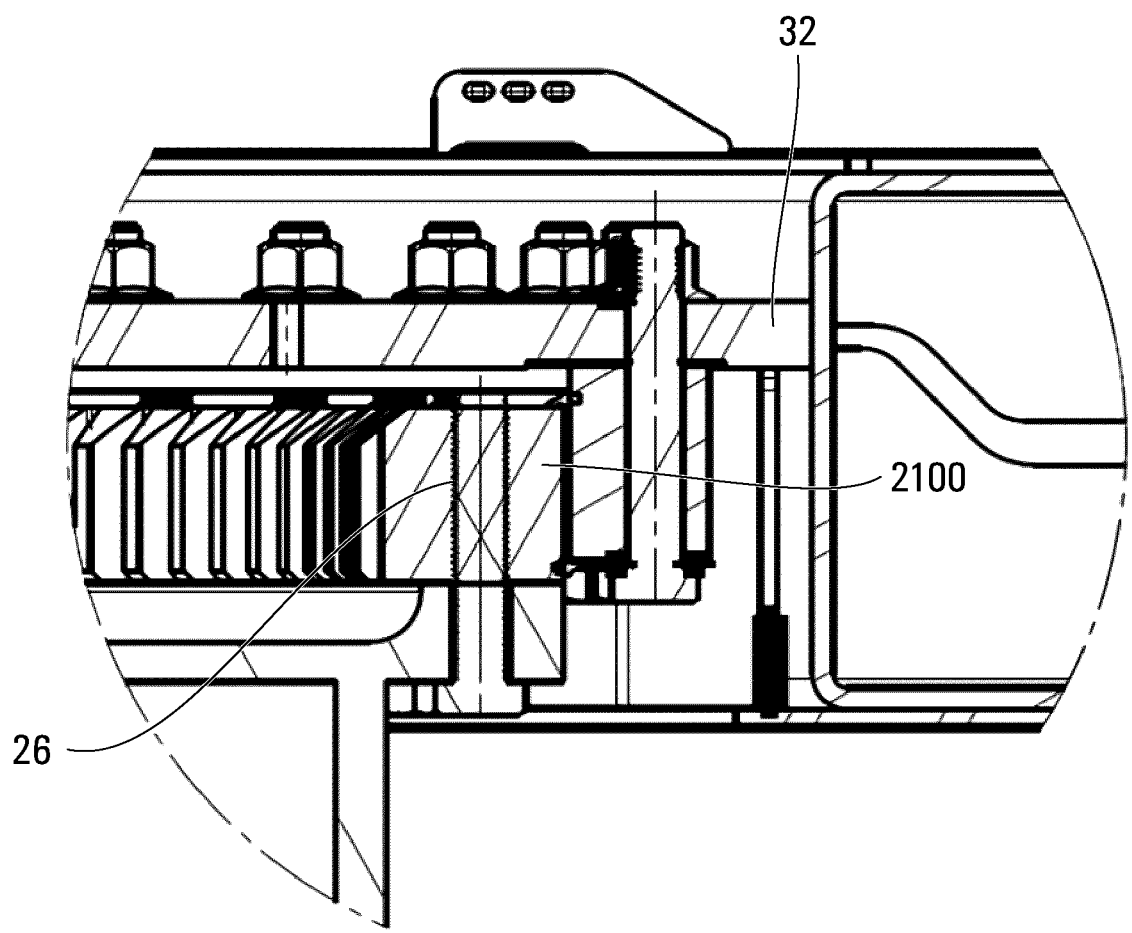

A vertical channel 16 contains a connecting unit 2100 that connects to the upper structure 32 and to the lower structure 26. In some embodiments, and as shown in FIGS. 21A-21C, the connecting unit 2100 may comprise a bearing. Various types of bearings may be used to permit rotation of the upper structure 32 relative to the lower structure 26, including but not limited to a slew bearing. The channel 16 may also surround, protect and/or facilitate the passage of electrical cables, pipes containing hydrostatic oil, a thermometer, and the like.

In the illustrated embodiment, a cab 18 is mounted to the upper structure 32. The cab 18 may seat an operator and, in some cases, may also seat one or more passengers. The cab 18 is configured to move together with the upper structure 32 when the upper structure 32 undergoes an angular displacement from an initial angular position relative to the lower structure 26. A motor 100 is configured to controllably rotate the upper structure 32 relative to the lower structure 26, based on an output from an engine control unit (ECU) 60 (sometimes referred to as a vehicle computer or a vehicle processor). The motor 100 can be anchored to the upper structure 32 and may engage the lower structure 26, or the motor 100 can be anchored to the lower structure 26 and may engage the upper structure 32; in either case, relative motion of the upper and lower structures 26, 32 is achieved as a result of a force applied by the motor 100.

In the present embodiment, two traction units 31X, 31Y are mounted to the body, specifically there is one traction unit on each of the two opposite lateral sides of the lower structure 26. In other embodiments, there may be more than two traction units. In a specific non-limiting embodiment, each of the traction units 31X, 31Y may be a track assembly comprising a drive wheel 22, an idler wheel 28 and one or more support wheels 24, surrounded by an endless track 30X, 30Y. The tracks may be any suitable tracks, such as rubber tracks including but not limited to metal embedded rubber tracks (MERT). Further details regarding a suitable non-limiting implementation of the track assemblies and tracks may be found in U.S. Pat. Nos. 9,616,947 and 9,604,679, hereby incorporated by reference herein.

Figure 15:
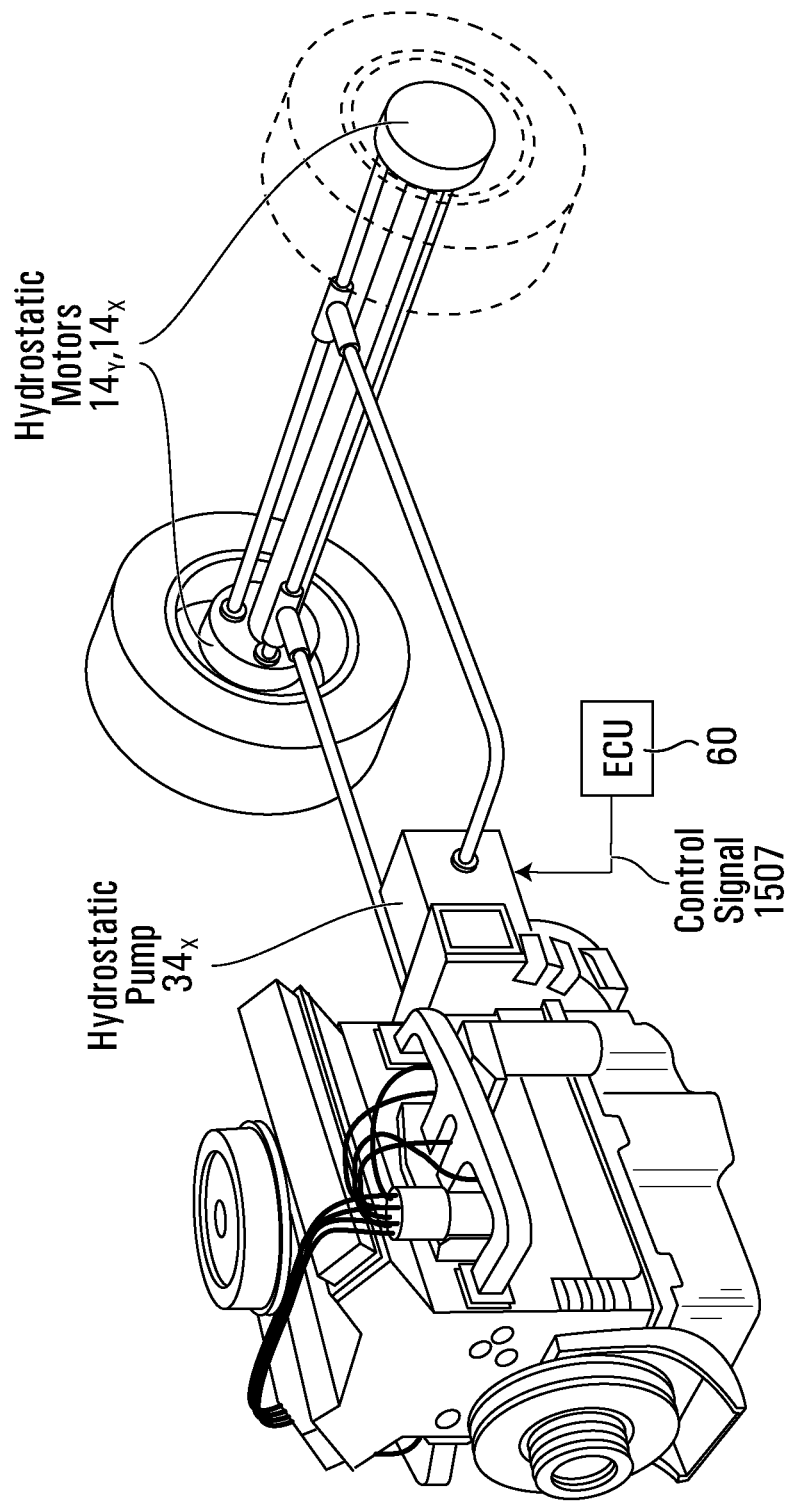
FIG. 15 is a perspective view of a hydrostatic transmission including one or more hydrostatic pumps coupled to a prime mover, in accordance with a non-limiting embodiment.
Figure 16:
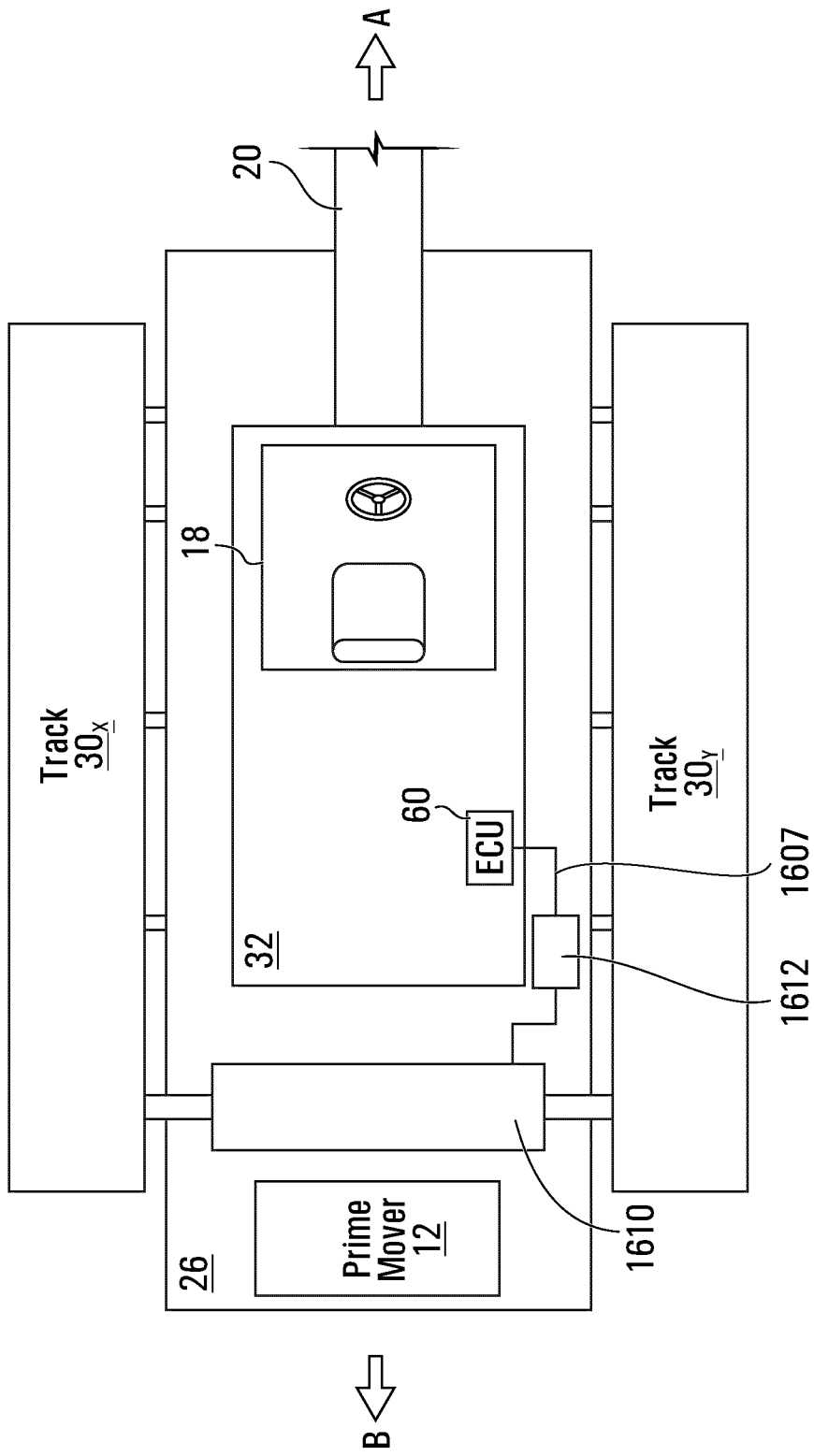
FIG. 16 is a conceptual top view of a prime mover mounted to the lower frame structure of the tracked vehicle, in accordance with a non-limiting embodiment.

A prime mover 12 is mounted to the body. In the illustrated embodiment, the prime mover 12 is mounted to the upper structure 32. However, this does not preclude mounting of the prime mover 12 to the lower structure 26, as shown in FIG. 16. The prime mover 12 may be an engine, such as an internal combustion (e.g., diesel or gasoline) engine or an electrically powered hydraulic motor, to name a few non-limiting possibilities. A transmission 1610 transfers power from the prime mover 12 to the track assemblies 31X, 31Y, e.g., to the drive wheel 22 of each of the track assemblies. In an embodiment, the transmission 1610 may be a hydrostatic transmission, as illustrated in FIG. 15. In particular, the hydrostatic transmission includes one or more hydrostatic pumps coupled to the prime mover 12. In particular, a hydrostatic pump 34X delivers a controllable amount of hydrostatic oil flow to a hydrostatic motor 14X that is mounted to one of the drive wheels 22. There may be two hydrostatic pumps that independently feed respective hydrostatic motors 14X, 14Y so as to provide independent control of the motion of the tracks 30X and 30Y. Each of the hydrostatic pumps is configured to regulate the amount of power that is transmitted to its corresponding track assembly 31X, 31Y, as well as the direction of rotation of the corresponding drive wheel 22, in accordance with a respective control signal 1507 received from the ECU 60. In another embodiment, conceptually shown in FIG. 16, the transmission 1610 may include a transmission control 1612 that is intermediate the prime mover 12 and the drive wheels 22 and is also fed by control signals 1607 from the ECU 60. In some embodiments, all of the hydraulics except the hydrostatic motors 14X, 14Y are mounted to the upper frame structure 32.

Each of the drive wheels 22 may turn in each of two opposite directions (clockwise and counter-clockwise when viewed from the corresponding side of the tracked vehicle 10), thus causing the corresponding endless track 30X, 30Y to move, thereby propelling the tracked vehicle 10 in a variety of possible directions of travel in a so-called "plane of travel", which is parallel to the ground. Two such directions are opposite one another and are aligned lengthwise with the lower structure 26. While it may be possible to refer to these two opposite directions of travel as "forward" and "reverse", these terms may lose their significance due to the symmetry with which the track assemblies may be controlled and due to the upper structure 32 (and the cab 18) being rotatable relative to the lower structure 26 (to which the track assemblies 31X, 31Y are attached). As such, the two opposite directions in which the tracked vehicle 10 may travel when the same amount of power (in matching rotational directions) is applied to both track assemblies 31X, 31Y by the transmission 1610 are referred to as "A" and "B" (shown in FIG. 16). By causing the amount of applied power between the two track assemblies to differ, the lower structure 26 can be made to turn about a central axis (not shown) that is transverse to the plane of travel, as would occur during a steering operation. It is noted that the axis 8 about which the upper and lower structures 32, 26 are rotatable relative to one another may in general also be transverse to the plane of travel of the tracked vehicle and may, but need not, correspond to the aforementioned central axis.

Figure 2:
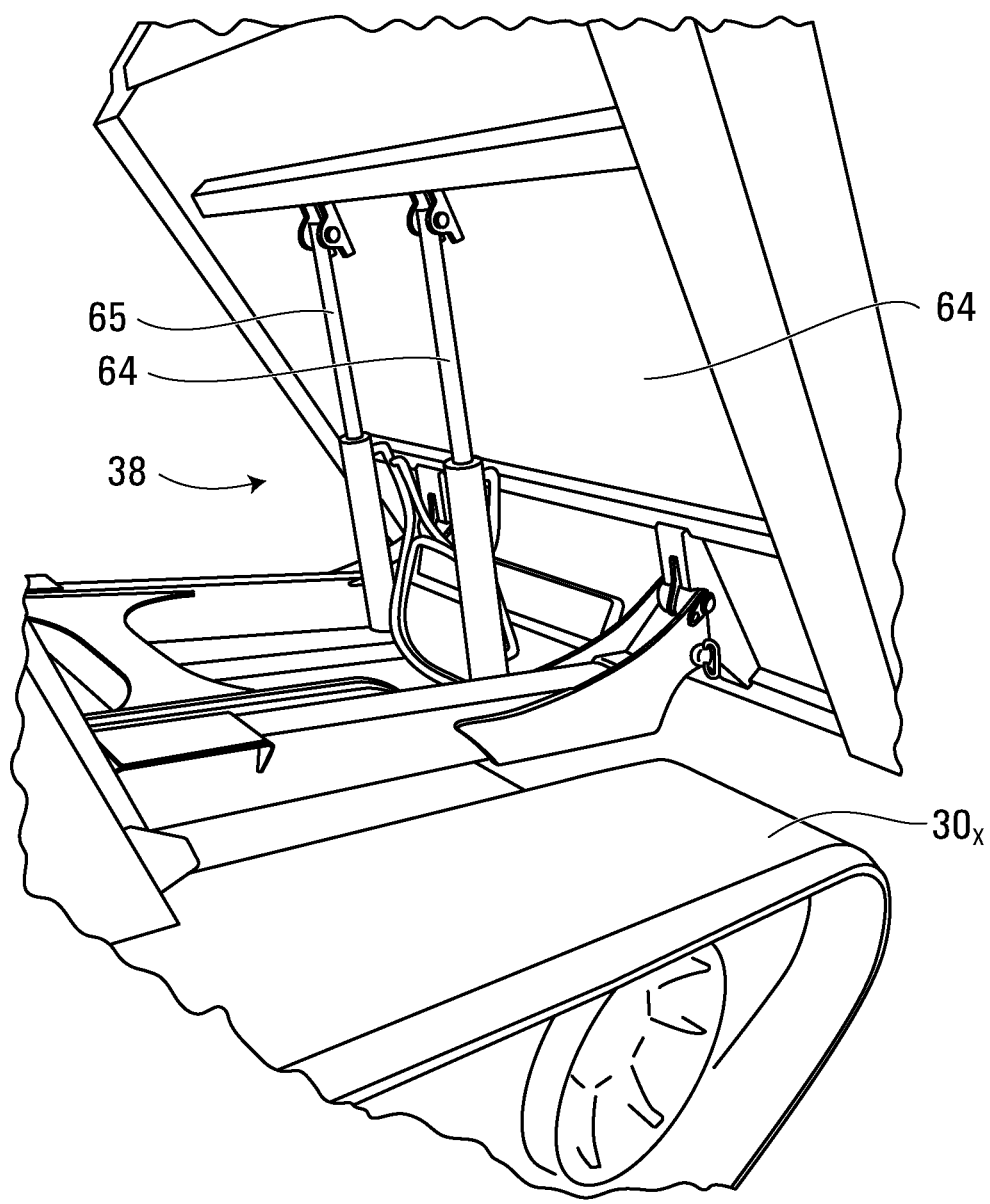
FIG. 2 is a perspective view of hydraulic cylinders with a digitally controlled pump used to control extension or retraction of cylinders, in accordance with a non-limiting embodiment.
Figure 18:
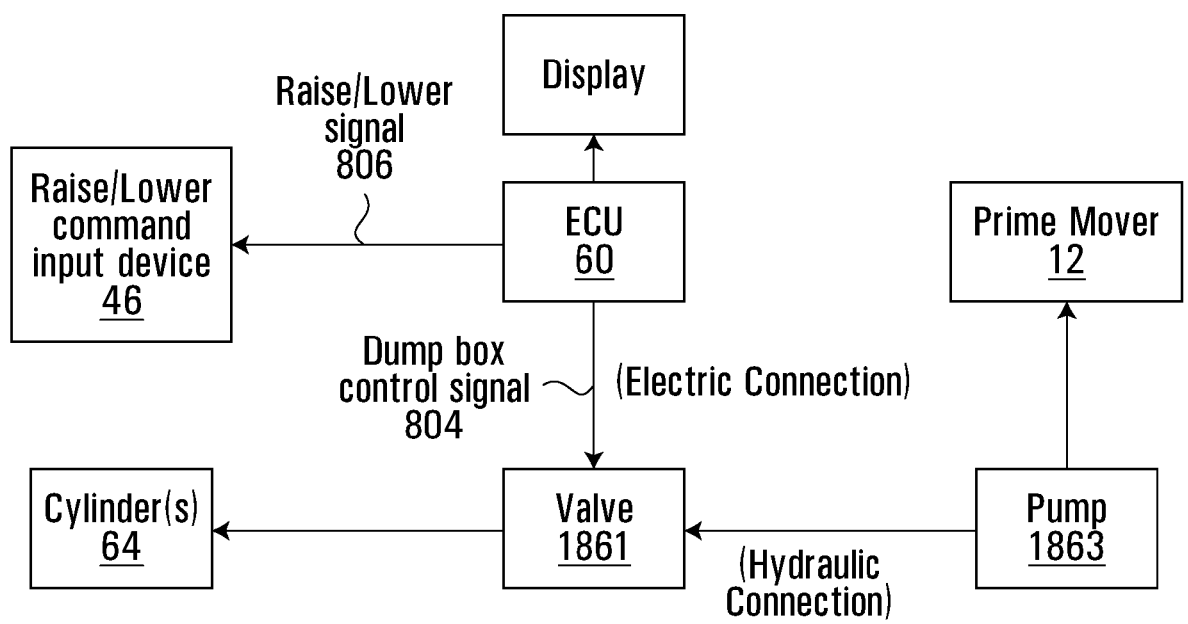
FIG. 18 is a block diagram of various components involved in producing a dump box control signal based on a lower/raise signal produced based on operator input, in accordance with a non-limiting embodiment.
Figure 19:
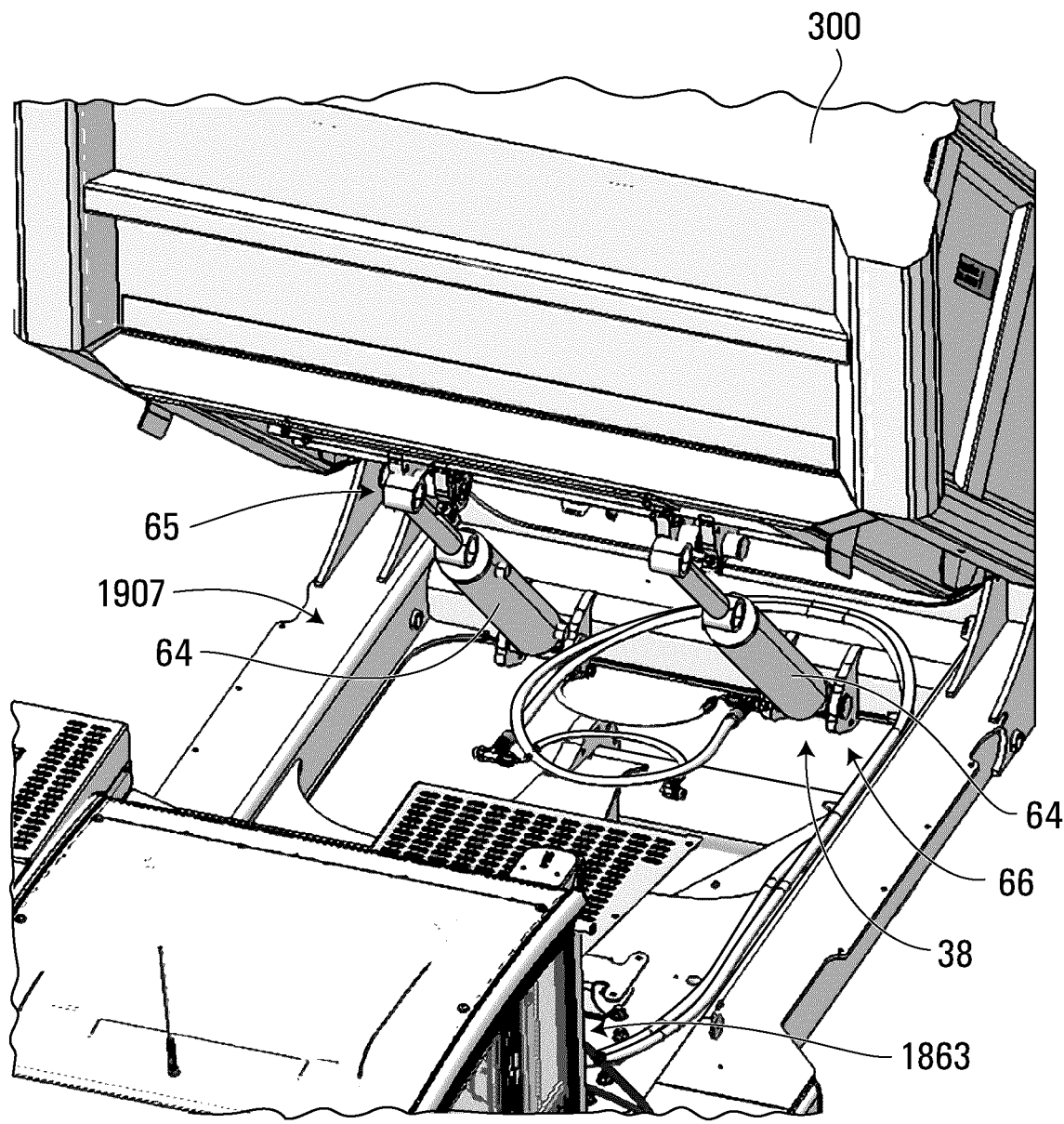
FIG. 19 is a perspective view of a hydraulic cylinders with a digitally controlled pump used to control extension or retraction of cylinders.
Figure 20:
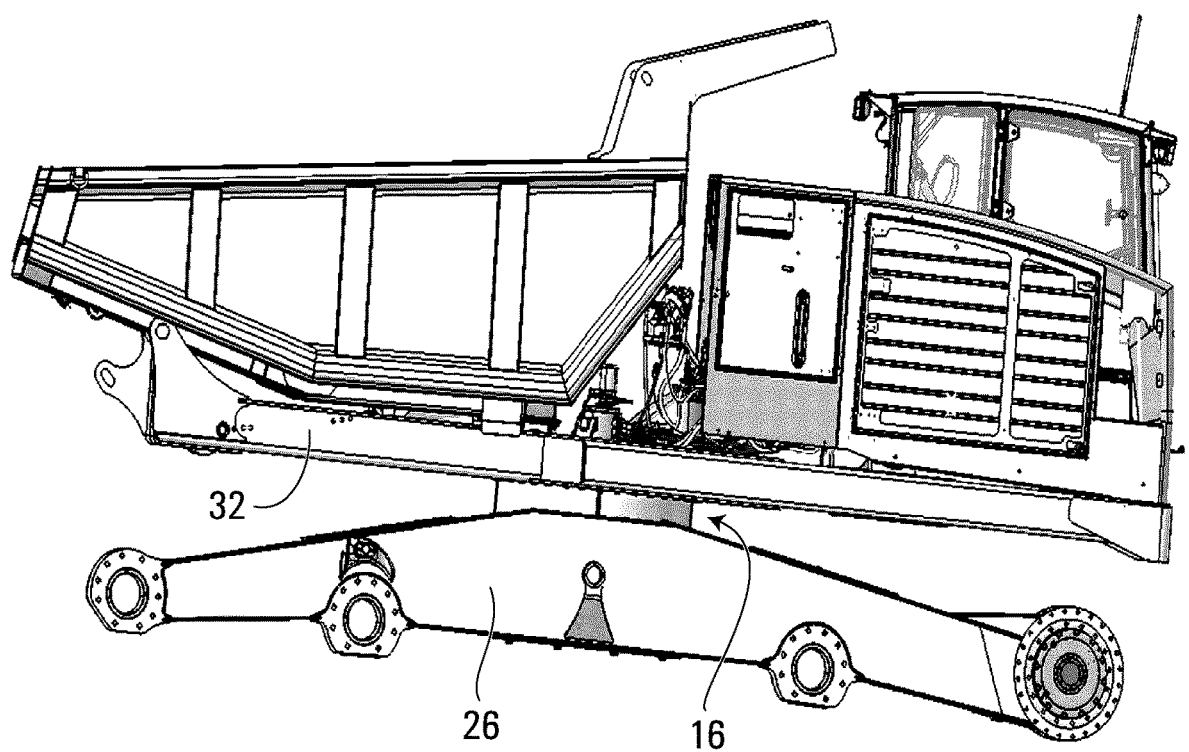
FIG. 20 is a side elevational view of part of a tracked vehicle including an upper frame structure, a lower frame structure, a cab and a dump box, in accordance with a non-limiting embodiment.

With additional reference to FIGS. 2, 18 and 19, the tracked vehicle 10 further comprises a work implement and a lifting unit 38. In some embodiments, the tracked vehicle 10 may be a dumper and therefore the work implement is a dump box and is denoted 300. However, in other embodiments, the tracked vehicle 10 need not be a dumper and the work implement may differ (e.g., it could be an articulated loader, crane, etc.).

The dump box 300 and the lifting unit 38 are mounted on the upper structure 32, in a region behind the cab 18 in the lengthwise direction of the tracked vehicle 10. As will be described later in this document, the dump box 300 may controllably pivot along a transverse axis (or pivot point) 321 to unload its contents in a region behind the operator of the tracked vehicle. Operation of the dump box 300 may be controlled by control signals transmitted from the ECU 60, which receives instructions input by the operator of the tracked vehicle 10.

In some embodiments, the dump box 300 may comprise a container-shaped body, whereas in other embodiments, the dump box 300 may comprise a container mounted on a separate frame. The dump box 300 is configured to carry a payload, which may be of various types such as sand, gravel, excavation materials, etc. The weight of the payload may range from zero to a maximum payload, which can range from a few tons to several hundred tons.

The dump box 300 is connected to the upper structure 32 by a pivotable connection 36. In a non-limiting example, the pivotable connection 36 may include an axle mounted to a bushing, but a more complex arrangement may be used. The lifting unit 38 connects to the upper structure 32 via one or more attachment points 66 and also connects to an underside of the dump box 300 via an attachment point 65. At least one of the attachment points 65, 66 may be pivotable, and in some cases both attachment points 65, 66 may be pivotable.

Figure 3A:
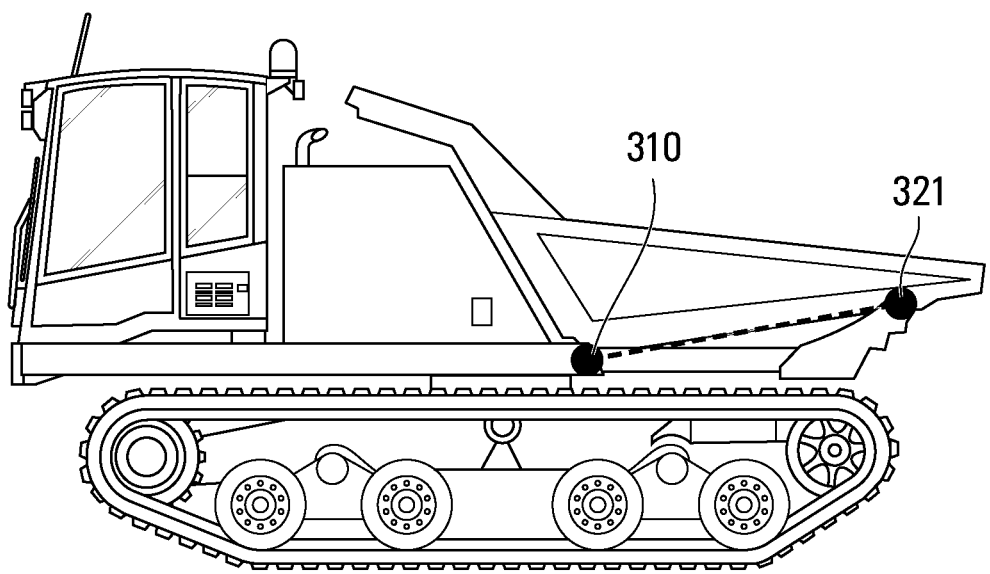
FIG. 3A is a side view of a tracked vehicle with a dump box in a rest position, in accordance with a non-limiting embodiment.
Figure 3B:
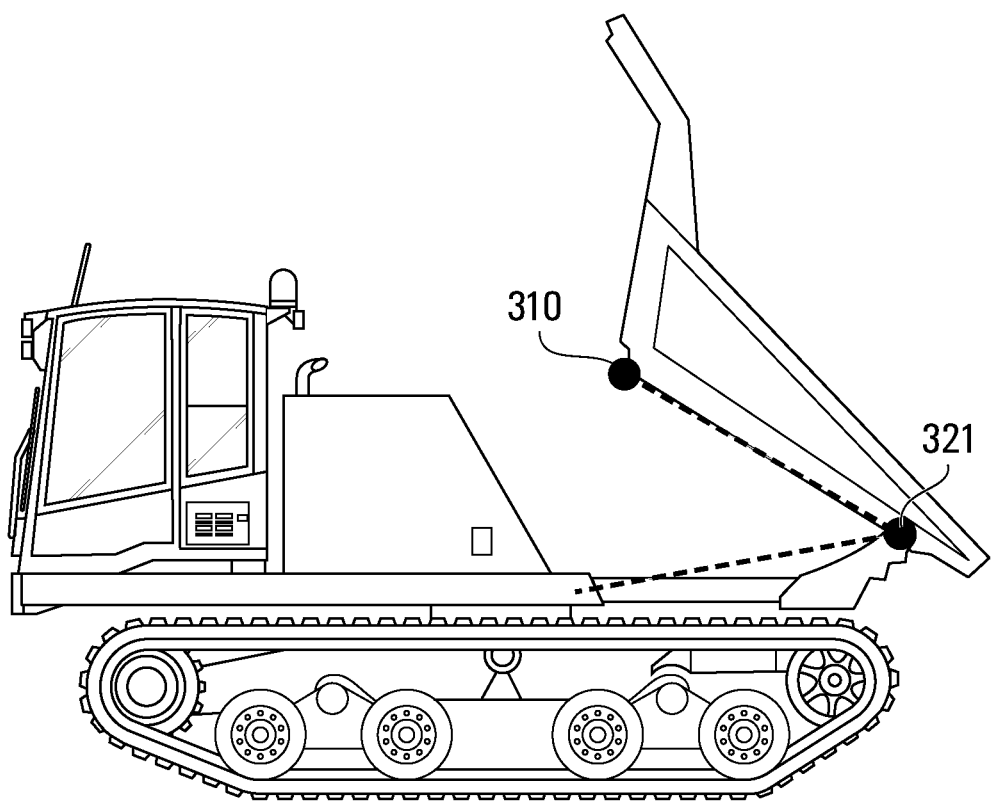
FIG. 3B is a side view of a tracked vehicle with a dump box in a fully tilted position, in accordance with a non-limiting embodiment.

The lifting unit 38 is configured to controllably pivot the dump box 300 about the pivotable connection 36 within a range of positions. The range of positions may include, at one extreme, a rest or minimum energy position (see FIG. 3A) and at the other extreme, a fully or maximally tilted position (see FIG. 3B). Both FIGS. 3A and 3B are shown without the lifting unit 38 for convenience and simplicity. The rest position may be defined as a position of the dump box 300 in which the dump box 300 is at rest with respect to the upper structure 32, that is to say, the position that would be taken by the dump box 300 in the absence of lifting power supplied by the lifting unit 38. The rest position may be considered as the position of the dump box 300 that requires the least amount of energy to maintain. The rest position may also be considered as the position of the dump box 300 beyond which the dump box 300 cannot be further lowered.

Those of skill in the art may find it convenient to distinguish between the rest position of the dump box 300 and a given tilted position by way of a "tilt angle" about the pivot point 321 of the pivotable connection 36. In particular, the rest position is associated with a tilt angle of zero, whereas a given tilted position is associated with a non-zero tilt angle. In order to visualize the concept of a tilt angle, one can select an arbitrary point 310 on the dump box 300 (shown in FIGS. 3A and 3B). Then, the angular displacement of point 310 about the pivot point 321 of the pivotable connection 36 (relative to the rest position) is considered the "tilt angle" of the dump box 300. The tilt angle may therefore range from zero to a maximum tilt angle. The greater the tilt angle, the more the pivotable connection 36, the lifting arm 38, the dump box 300 and the upper structure 32 become vulnerable to damage in the face of movement of the tracked vehicle in direction A or B.

Those skilled in the art will appreciate that tilting the dump box 300 (i.e., achieving a tilt angle greater than zero, up until the maximum tilt angle) may facilitate dumping of the contents that may be present in the dump box 300. To this end, the lifting unit 38 may comprise one or more lifting arms, which may be of a pneumatic or hydraulic type, to name two non-limiting possibilities.

In a non-limiting embodiment, each of the lifting arms may include a set of cylinders 64 (see FIGS. 2 and 19) that are pivotally connected to the underside of the dump box 300 by the attachment point 65 and also pivotally connected to the upper structure 32 by the attachment point 66. The attachment points 65, 66 allow expansion of the cylinders 64 to raise the dump box 300 to an angled dumping position.

An electronically controlled pump 1863 (e.g., connected to the prime mover 12) may be used to control extension or retraction of the cylinders 64. This is illustrated in FIG. 18, which shows that a hydraulic connection exists between the prime mover 12 and the cylinders 64 via the pump 1863 and a control valve 1861. The control valve 1861 is controlled by an electrical signal (herein below described as a "dump box control signal" 804) received from the ECU 60. The dump box control signal 804 is generated by the ECU 60 based in part on a lower/raise signal 806 received from a lower/raise command input device (to be described later).

It should be appreciated that there is a 1:1 relationship between the extension of the cylinders 64 (in cm) and the tilt angle (in degrees), and therefore the notion of a tilt angle may be used to signify a measure of angular degrees or a measure of linear displacement. The relationship can also be stored in a data memory 68 of the ECU 60.

Of course, other implementations of the lifting unit 38 (and its control) are possible.

The attachment point 65 where the lifting unit 38 connects to the dump box 300, as well as the attachment point 66 where the lifting unit 38 connects to the upper structure 32, may be disposed at various distances relative to the front or rear of the tracked vehicle 10, depending on operational considerations.

In a first embodiment, the attachment point 65 is within the 10% or 20% of the dump box 300 (in the longitudinal direction of the tracked vehicle 10) closest to the front of the tracked vehicle 10, and the attachment point 66 is located directly behind the prime mover 12 or the cab 18.

In a second embodiment (illustrated in FIGS. 2 and 19, for example), the attachment point 65 is located towards the middle of the underside of the dump box 300 (in the longitudinal direction of the tracked vehicle 10), and the attachment point 66 is within the 10% or 20% of the tracked vehicle 10 (in a longitudinal direction) closest to the rear of the tracked vehicle 10.

If the lifting unit 38 were to use lifting arms, then the first embodiment described above requires significantly longer reach than the second embodiment. For this reason, telescoping lifting arms may be needed in the first embodiment, which implies bigger cylinders and more space. Such space may not be available in a vertical direction given that the vertical channel 16 already takes up some of the available height of the tracked vehicle 10. As such, the second embodiment may be used. However, the second embodiment requires more power during lifting as there is less of a lever effect about the pivot point 321 than the first embodiment. This means that there is more force placed on the upper structure 32 during lifting of the dump box 300 in the second embodiment (see, FIGS. 2 and 19, for example), which makes the upper structure 32 susceptible to damage caused by sudden or fast movement of the tracked vehicle 10.

The pivotable connection 36 may be located at various heights relative to the ground 88, depending on operational considerations. If one considers the upper structure 32 as having a top surface portion 1907 that supports part of the dump box 300 in the rest position, then the pivotable connection 36 and, indeed the pivot point 321 of the pivotable connection 36, may be located at a height (with respect to the ground 88) that is in some cases higher than the top surface portion 1907 of the upper structure 32 and in other cases equal to or lower than the top surface portion 1907 of the upper structure 32.

Figure 4:
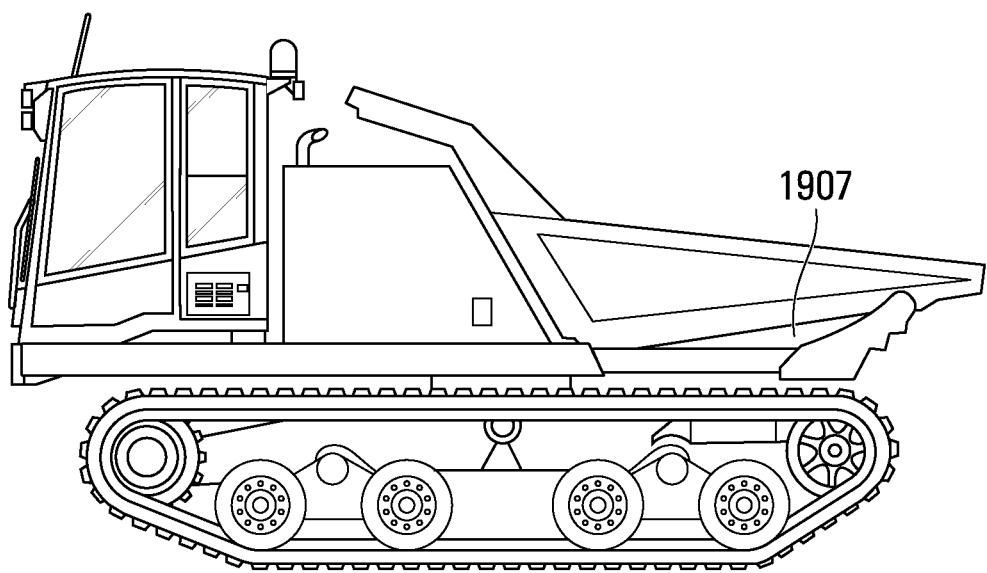
FIG. 4 is a side view of a tracked vehicle with a dump box angled towards a front of the tracked vehicle, in accordance with a non-limiting embodiment.

In the rest position, at least part of the underside of the dump box 300 may be supported by and in physical contact with at least part of the top surface portion 1907 of the upper structure 32. With reference to FIG. 4, the dump box 300 dips/is angled towards the front of the tracked vehicle 10 and therefore only a small portion of the underside of the dump box 300 is supported by the top surface portion 1907 of the upper structure 32 in the rest position. In other embodiments, the dump box 300 lies substantially flat atop the upper structure 32 and therefore a substantial portion of the underside of the dump box 300 is supported by and in physical contact with the top surface portion 1907 of the upper structure 32 in the rest position.

Vehicle Operator Interface 78

The cab 18 includes a vehicle operator interface 78 comprising a plurality of input devices used by the operator to enter commands for movement, operation and control of the tracked vehicle 10.

The input devices of the vehicle operator interface 78 may include:

A shifter 50 through which the operator may enter a chosen relative direction (forward/drive, reverse) of the tracked vehicle 10. In some embodiments, the shifter 50 may include a feature whereby a gear level (low, high, neutral, $1^{st}$, $2^{nd}$ etc.) is selected by the operator. The shifter 50 may be mounted on the steering column of the steering wheel 40 in some embodiments.

Figure 1D:
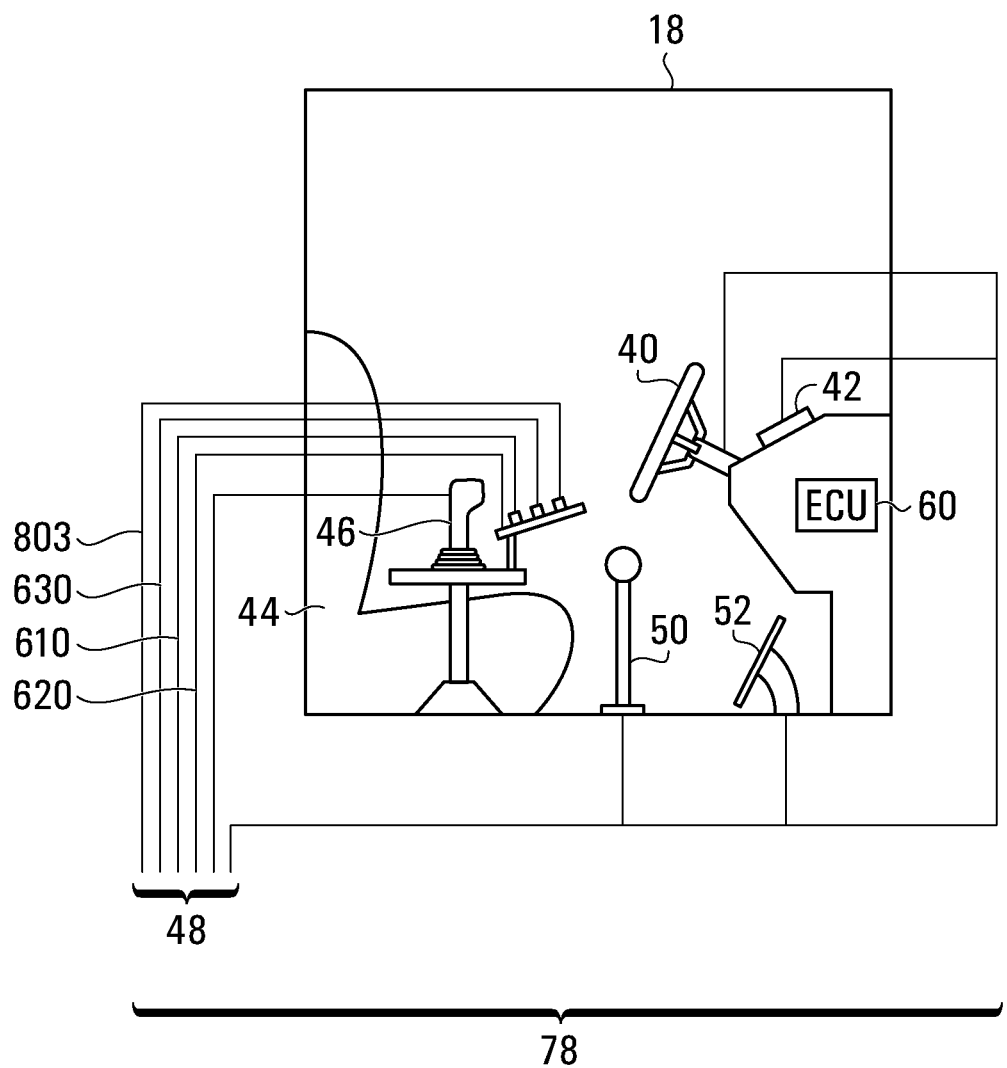
FIG. 1D is a conceptual side view of an embodiment of a cab interior, in accordance with a non-limiting embodiment.

An accelerator 52 (e.g., pedal, joystick, lever or other device) through which the operator may enter demand for more or less movement in the chosen relative direction (also referred to as a "motion demand input"). With reference to FIG. 1D, in some embodiments, the accelerator 52 is in the form of a pedal with "infinitely variable" positioning such that an angle of the pedal is directly related to the demand for speed, and the pedal may be biased towards an initial position where the demand is for zero movement, i.e., releasing one's foot off of the pedal causes deceleration of the tracked vehicle until it stops. Optionally, a brake pedal (not shown) or other mechanism may be provided through which the operator may enter a demand for deceleration.

A steering unit 40 (e.g., steering wheel, joystick, scroll bar, touch screen, lever) through which the operator may enter a demand for turning the tracked vehicle 10 (i.e., changing the orientation of travel of the lower structure 26).

Other input devices of the vehicle operator interface 78 may also be provided to control various aspects of the tracked vehicle 10 (e.g., ignition, radio, heating, seat adjustment, etc.).

The vehicle operator interface 78 also comprises a set of operator-destined outputs configured for providing feedback to the operator about certain conditions of the tracked vehicle 10. To this end, the vehicle operator interface 78 may include a dashboard 42 configured to display a plurality of visual effects (e.g., lights, icons, symbols, pictograms, etc.) that may be controlled (e.g., illuminated) by the ECU 60. The visual effects may convey various data and events such as vehicle speed, engine speed (RPM), oil temperature, chosen relative direction, fuel level, etc. The vehicle operator interface 78 may also include one or more lights or loudspeakers (not shown) configured to signal data and events such as a backup warning signal.

Dump Box Control Center 48

The vehicle operator interface 78 may further include a dedicated dump box control center 48 comprising a plurality of input devices specifically used by the operator to enter commands for movement, operation and control of the dump box 300. The dump box control center 48 may in some cases be partly integrated with a seat 44 on which the operator sits, e.g., within the armrest. In some embodiments, the dump box control center 48 may be split up into different parts occupying different areas of the cabin, including the seat 44 and the dashboard 42, for example.

Figure 6:
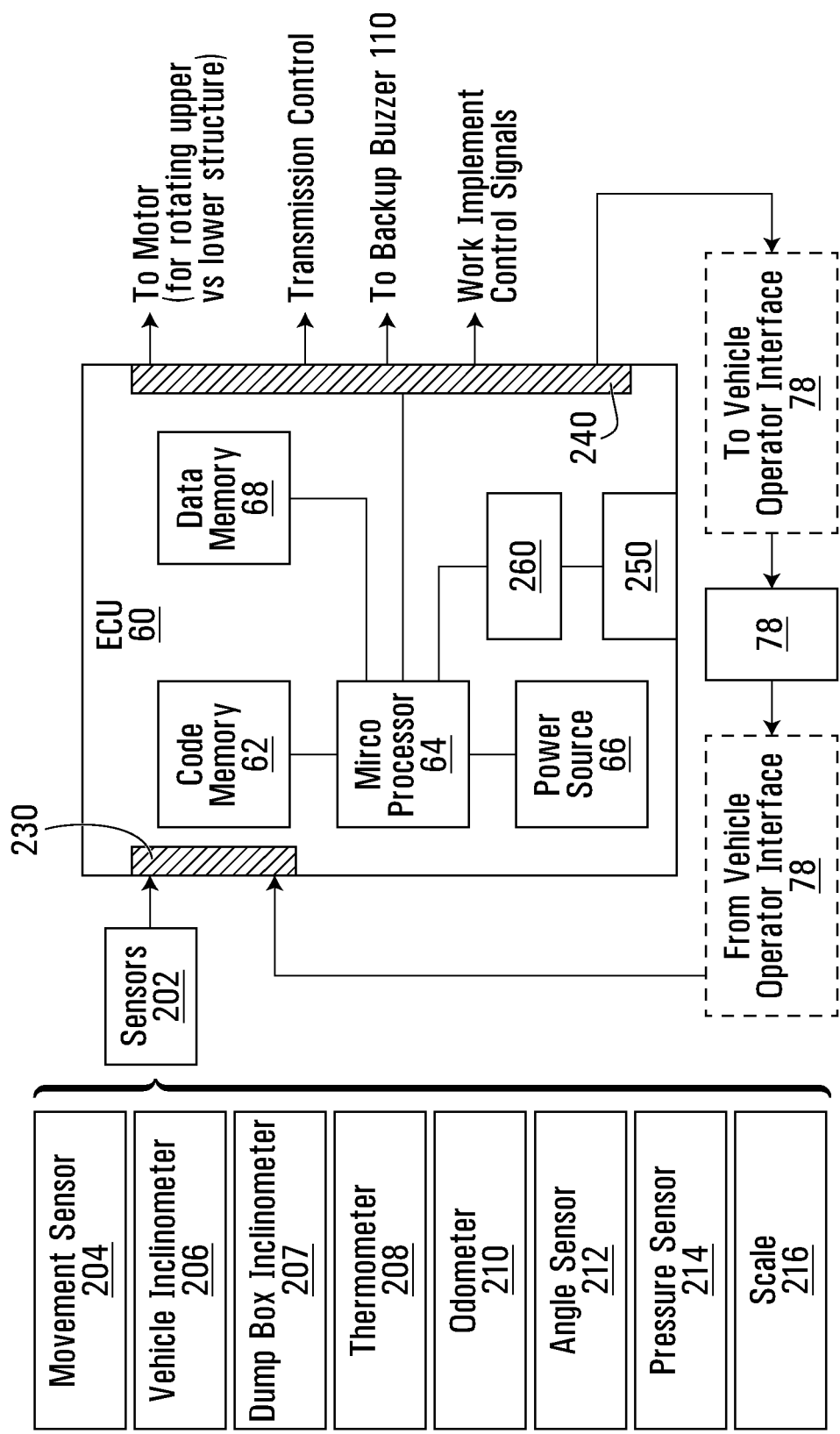
FIG. 6 is a block diagram depicting a plurality of sensors configured to detect, read and/or measure a variety of parameters of the tracked vehicle and to send their outputs to an ECU, in accordance with a non-limiting embodiment.

With reference to FIGS. 1D and 6, the input devices of the dump box control center 48 may include:

A "lower/raise command input device" 46 through which the operator may enter a command to control (e.g., lower or raise) the lifting unit 38. In some embodiments, the lower/raise command input device 46 may be embodied as a joystick that produces an electrical signal (a "lower/raise signal" 806) that is responsive in an intuitive way to pressure applied thereto (e.g., push/pull the joystick corresponds to lower/raise the dump box 300). Stated differently, the joystick is a type of input device that is actionable by a first type of external action associated with an attempt to raise the work implement (e.g., pulling back on the joystick will raise the dump box 300, unless already raised to its maximum) and by a second type of external action associated with an attempt to lower the dump box 300 (e.g., pushing the joystick will lower the dump box 300, unless already at rest). The first and second external actions refer to actions done by an entity other than the vehicle itself, such as by the operator, whether such actions be deliberately or accidentally carried out. In fact, it is in the realm of mitigating damage resulting from accidental external actions on the lower/raise command input device 46 that certain embodiments of this disclosure may find their use. Of course, devices other than a joystick may serve as the lower/raise command input device 46.

A "target tilt angle command input device" 610 through which the operator may enter a command to set a "target tilt angle" of the lifting unit 38. In some embodiments, the target angle command input device may be implemented as a touch-sensitive region on a dedicated touchscreen 620 of the dump box control center 48. Touchscreen electronics may be configured to convert the operator input into the target tilt angle (denoted $\Theta_D$) that is stored in computer memory.

A "directionality control input device" 630 through which the operator may enter a directionality switchover request, as described in US PG Publication 2019/0242092 to Prinoth Ltd., hereby incorporated by reference herein. In some embodiments, the directionality control input device 620 may be implemented as a touch-sensitive region on the dedicated touchscreen 620 of the dump box control center 48. Touchscreen electronics may be configured to convert the operator input into a directionality switchover request that is stored in computer memory.

Other input devices of the dump box control center 48 not shown in the drawings may also be provided to control various aspects of the movement and lifting of the dump box 300.

The dump box control center 48 also comprises a set of operator-destined outputs configured for providing feedback to the operator about certain conditions of the dump box 300.

To this end, the dump box control center 48 may include a screen (e.g., part of the aforementioned touchscreen 620) configured to display a plurality of visual effects (e.g., lights, icons, symbols, pictograms, etc.) that may be controlled (e.g., illuminated) by the ECU 60. The visual effects may convey various data and events such as whether the dump box 300 is flat or non-flat, the tilt angle of the dump box 300, the directionality of the upper structure 32, etc. The dump box control center 48 may also include one or more lights or loudspeakers (not shown) configured to signal data and events such as an excessive tilt warning.

It should be appreciated that in some embodiments, the dump box control center 48 may be integrated with the vehicle operator interface 78, in which case some or all of the aforementioned inputs are entered via the vehicle operator interface 78 and, similarly, some or all operator-destined outputs are transmitted via the vehicle operator interface 78.

It should also be appreciated that the lifting unit 38, the lower/raise command input device 46 and the ECU 60 may together be considered to form a work implement tilt control system for the tracked vehicle 10.

Sensors

With continued reference to FIG. 6, the tracked vehicle 10 also comprises a plurality of sensors 202, which are configured to detect, read and/or measure a variety of parameters of the tracked vehicle 10 and to store their outputs in memory or to send their outputs to the ECU 60 via digital or analog electronic signals.

For example, the plurality of sensors 202 may include:

A movement sensor 204 for sensing a movement characteristic such as speed and/or acceleration, for example. As such, the movement sensor 204 can include a speed sensor, an acceleration sensor, an inertial motion unit, a gyroscope or other device or a combination of devices. In one example, the movement sensor 204 includes a rotation sensor that infers a speed of the tracked vehicle 10 by measuring a rotating component of the tracked vehicle. For example, the rotation sensor may measure a rotation speed of the hydrostatic motors 14X, 14Y, from which a speed of the tracked vehicle 10 may be calculated. The overall vehicle speed can be obtained as an average of the two readings of the rotation speeds of the two hydrostatic motors 14X, 14Y. Acceleration can be obtained by computing the derivative of the speed, or by a separate sensor or sensor suite (so as to measure acceleration in multiple directions).

A vehicle inclinometer 206 configured to measure a slope of the tracked vehicle 10.

A dump box inclinometer 207 to measure a tilt angle of the dump box 300 about the pivotable connection 36 relative to its rest position. The tilt angle can be expressed in terms of a number of degrees or can be equivalently expressed as a height (e.g., in cm or mm) by which a portion of the dump box 300 has been raised from its rest position.

An odometer 210 configured to measure a distance traveled.

A thermometer 208 configured to detect/measure temperature of engine oil and/or hydrostatic oil and/or an exterior temperature.

Figure 5:
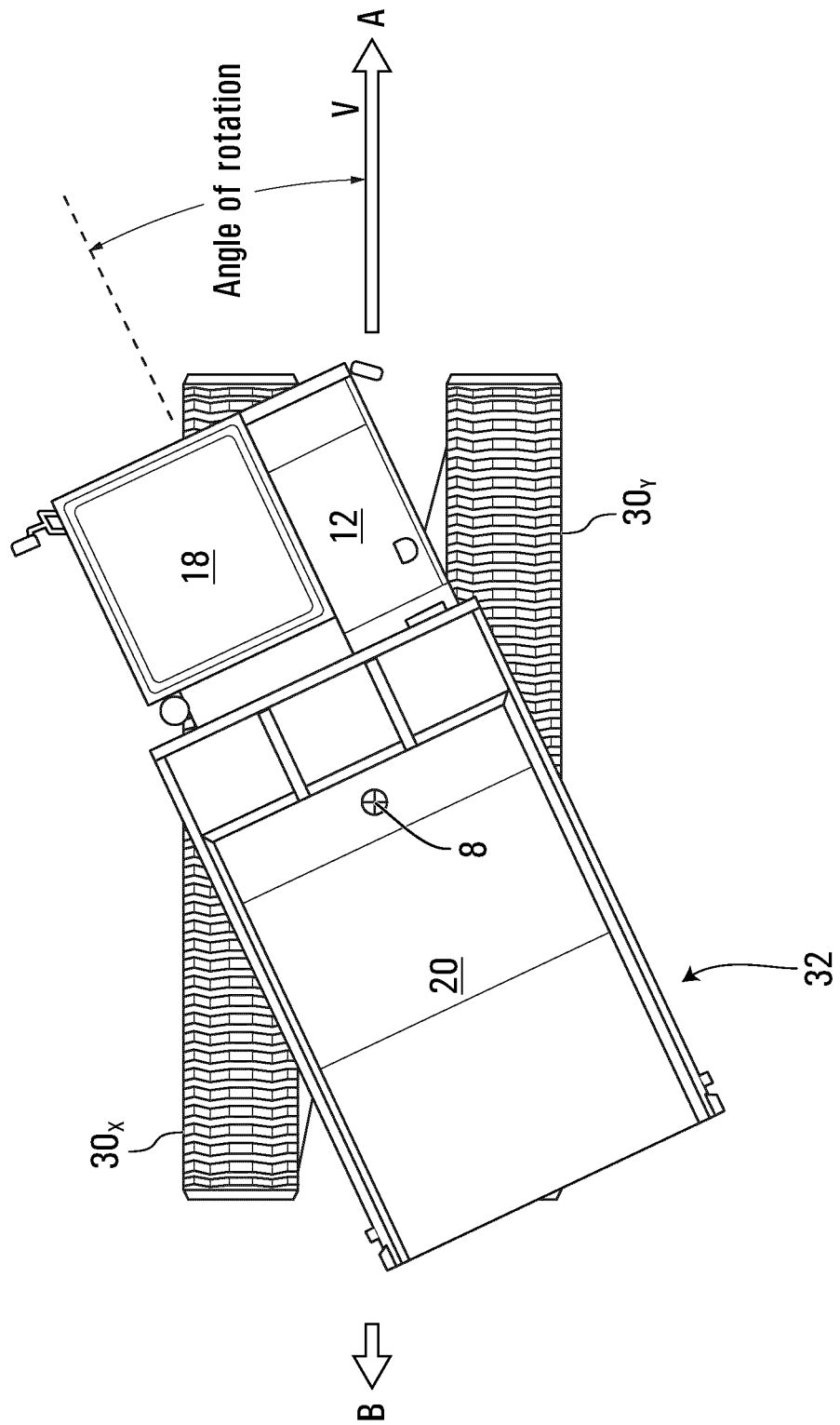
FIG. 5 is a top view of a tracked vehicle with an upper frame structure partially rotated relative to the lower frame structure, in accordance with a non-limiting embodiment.

An angle sensor 212 configured to detect/measure an angle of rotation of the upper structure 32 relative to an initial angular position. The initial angular position may be arbitrarily chosen and, as shown in FIG. 5, in this case the initial angular position is chosen to be in the direction A. Thus, the reading of the angle sensor 212 will be a value between −180 degrees and 180 degrees, taken with respect to a vector V pointing in the direction A. The angle sensor 212 is configured to provide its angular displacement readings to the ECU 60. The angle sensor 212 may be mounted to the upper structure 32 or to the lower structure 26 or may be partly mounted to both the upper structure 32 and the lower structure 26. By way of two non-limiting examples, the angle sensor 212 may be implemented as an encoder or as a potentiometer. An example of an encoder-based angle sensor is model ST350R (or ST350R-H1-360-1-1-X-P) from Sensor Systems SRL, Chiari, Italy, although a variety of other encoder-based angle sensors may be suitable. Potentiometer-based angle sensors may also be used. Angle sensors based on camera measurements may also be used.

A pressure sensor 214 to sense ground pressure of the traction units 31X, 31Y.

A scale 216, which may be configured to measure the weight of the contents of the dump box 300 (i.e., the "payload weight").

These are all non-limiting examples of the sensors 202, and other possibilities exist.

Vehicle Processor/Computer/ECU

The input devices of the vehicle operator interface 78 (including the input devices from the dump box control center 48) as well as the sensors 202 all produce electrical signals that are fed to the ECU 60. The ECU 60 processes the received electrical signals in accordance with a control program so as to provide control of motion and operation of the tracked vehicle 10, including driving the track assemblies 31X, 31Y, tilting/lowering of the dump box 300 via the lifting unit 38 and feeding information back to the operator via the vehicle operator interface 78 (including the dump box control center 48) in the form of operator-destined outputs.

With reference to FIG. 6, the ECU 60 may include a microprocessor 60A, a code memory 62, the data memory 68, a power source 66 (which may draw electric power from an alternator (not shown)), an input interface 230 and an output interface 240. Additionally, the ECU 60 may include a network interface 250 and network communication equipment 260, which allow communication with, e.g., a network access point using wireless communication techniques. In an embodiment, the microprocessor 60A is configured to execute computer-readable instructions stored in the code memory 62. The instructions encode a control program which, when executed by the processor, causes the microprocessor 60A (and therefore the ECU 60) to carry out a variety of interlinked processes (or routines). Each process controls certain functionality of the tracked vehicle 10 based on signals produced by certain input devices and/or sensors, as well as parameters stored in the data memory 68.

Dump Box Control Algorithm (General)

An example of a process carried out by the ECU 60 as a result of executing the computer-readable instructions in the code memory 62 is a "dump box control algorithm" for providing electronic control of the lifting unit 38, based on certain signals produced by certain input devices of the vehicle operator interface 78 (including the dump box control center 48), and the readings of certain ones of the sensors 202.

In particular, the sensors 202 allow the ECU 60 to determine the position of the dump box 300 (e.g., having a non-zero tilt angle tilted relative to the frame or at rest on the frame) and to detect a movement characteristic of the tracked vehicle 10 relative to the ground 88 (which could be speed or acceleration, for example). This information is monitored by the ECU 60, which runs the "dump box control algorithm" that may involve testing for one or more conditions. Based on the condition(s) being met, the ECU 60 produces a signal (the "dump box control signal" 804) to control the lifting unit 38 so as to cause the dump box 300 to be autonomously returned/lowered to the rest position.

Dump Box Control Algorithm (Version 1)

Figure 9:
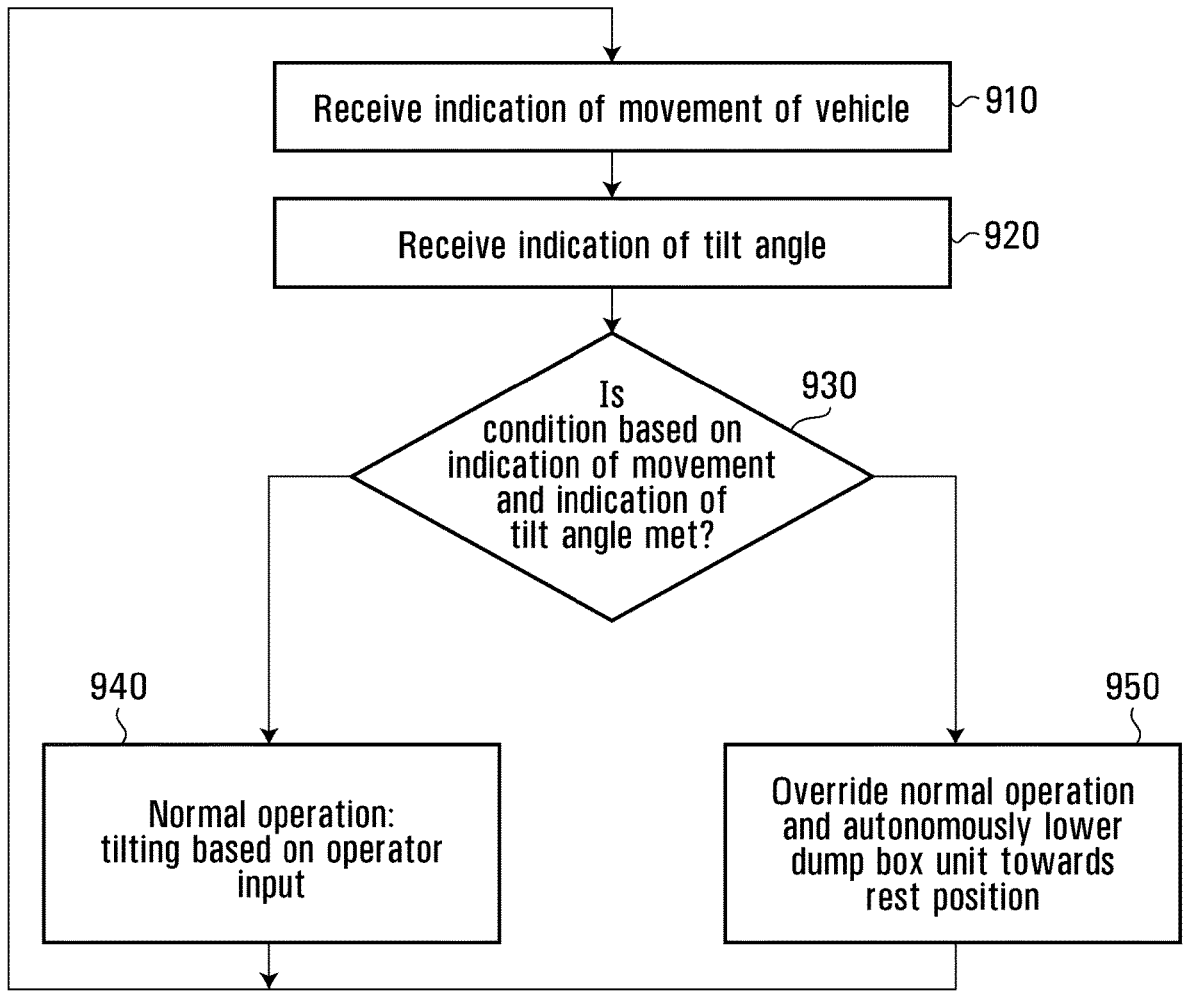
FIG. 9 is a flowchart showing general operation of the dump box control algorithm, in accordance with a non-limiting embodiment.

A specific non-limiting embodiment of the dump box control algorithm will now be described in greater detail with reference to FIG. 9. At step 910, an indication of movement of the tracked vehicle 10 is received. At step 920 (which may occur before step 910 or contemporaneously therewith), an indication of a tilt angle of the dump box 300 is received. The tilt angle can be expressed in terms of a number of degrees or can be equivalently expressed as a height (e.g., in cm or mm) by which a portion of the dump box 300 has been raised from its rest position. At step 930, it is determined whether an overall condition based on the indication of movement and the indication of tilt angle is met. If not, the dump box control algorithm proceeds to step 940, where normal operation takes place, i.e., tilting of the dump box 300 is controlled based on operator input. If yes, however, the dump box control algorithm proceeds to step 950, whereby normal operation may be overridden and the dump box 300 is caused to forcibly and autonomously pivot towards the rest position. Thereafter, the dump box control algorithm returns to step 910.

The overall condition being met may be a combination of conditions, expressed conceptually as follows using Boolean operators:

[overall condition]=[condition 1] AND [condition 2] AND [condition 3] etc.

where

[Condition 1] can be One of:
[the tracked vehicle 10 is moving relative to the ground 88];
[the tracked vehicle 10 is moving relative to the ground 88 above a threshold speed];
[the tracked vehicle 10 is accelerating]; or
[the tracked vehicle 10 is accelerating at greater than a threshold acceleration]

and

[Condition 2] can be One of:
[the position of the dump box 300 is other than the rest position]; or
[the dump box 300 is inclined by a tilt angle greater than a critical angle].

Figure 7A:
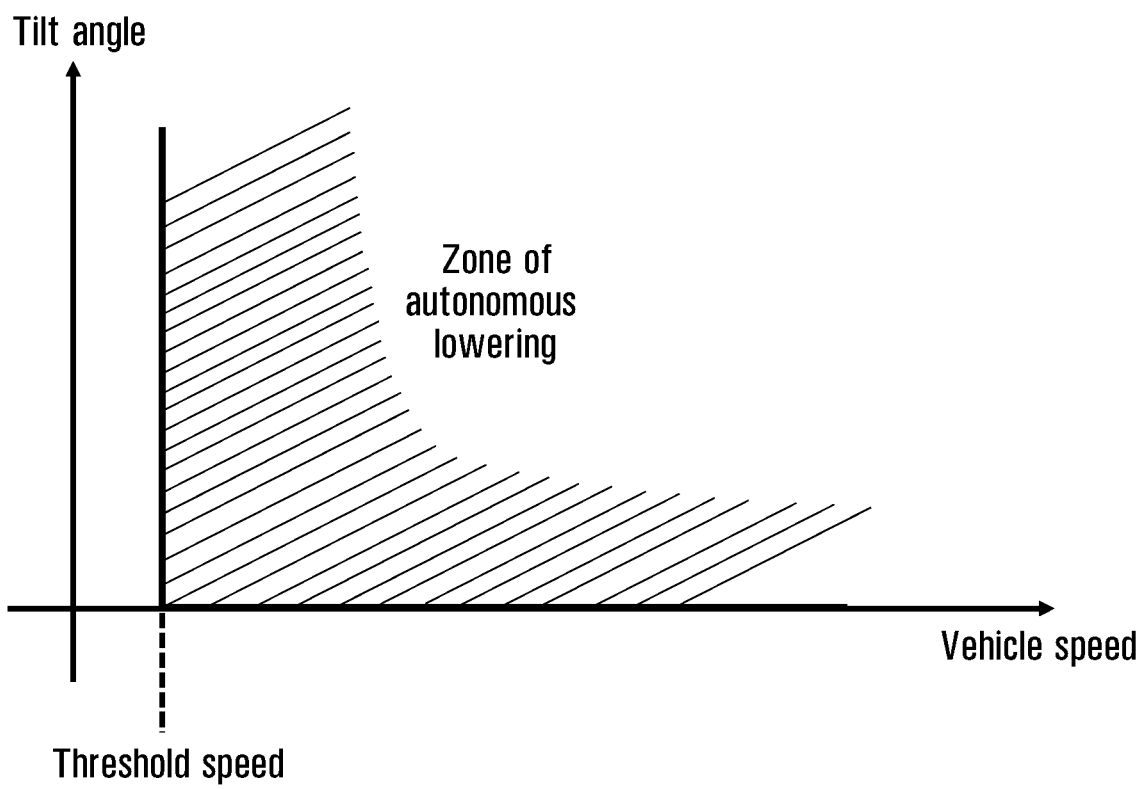
FIG. 7A is a graphical representation of a case where for a speed less than a threshold speed, no lowering action is triggered, but for a speed that is above the threshold speed, lowering of the dump box is triggered for all tilt angles that are not already zero, in accordance with a non-limiting embodiment.

The special case where [condition 1]=[the tracked vehicle 10 is moving relative to the ground 88 above a threshold speed] and [condition 2]=[the position of the dump box 300 is other than the rest position] is illustrated in FIG. 7A, where for a speed less than the threshold speed, no lowering action is triggered, but for a speed that is above the threshold speed, lowering of the dump box 300 is triggered for all tilt angles that are not already zero.

Figure 7B:
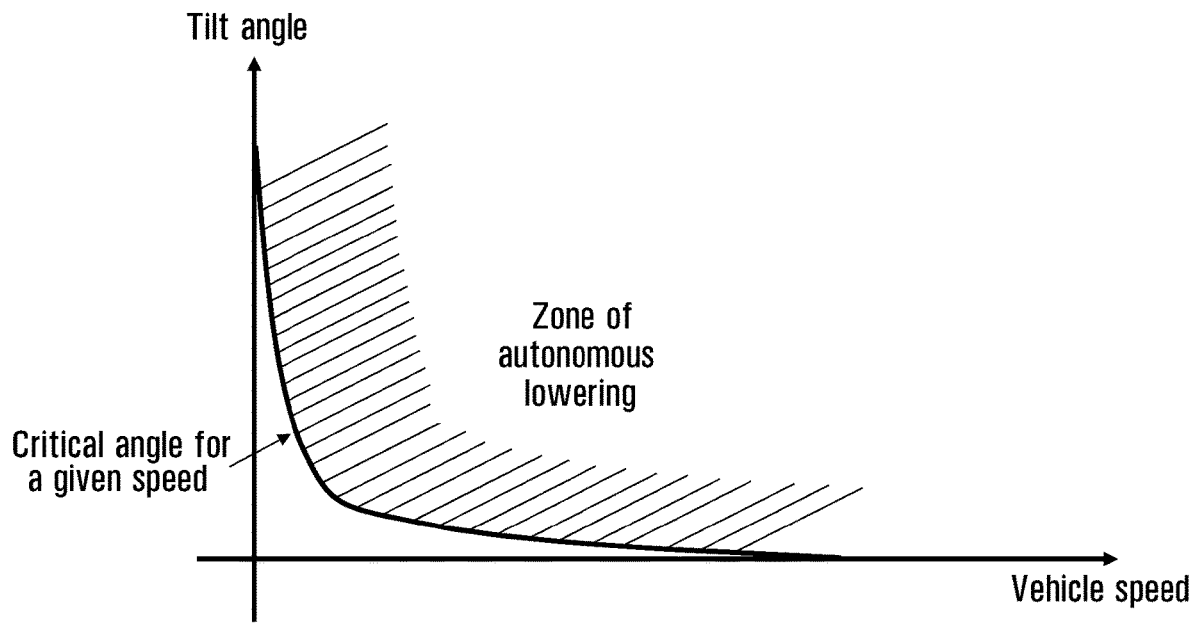
FIG. 7B is a graphical representation of a case where for any given speed, there exists a critical angle such that if the tilt angle is above the critical angle, autonomous lowering of the dump box is triggered, in accordance with a non-limiting embodiment.
Figure 7C:
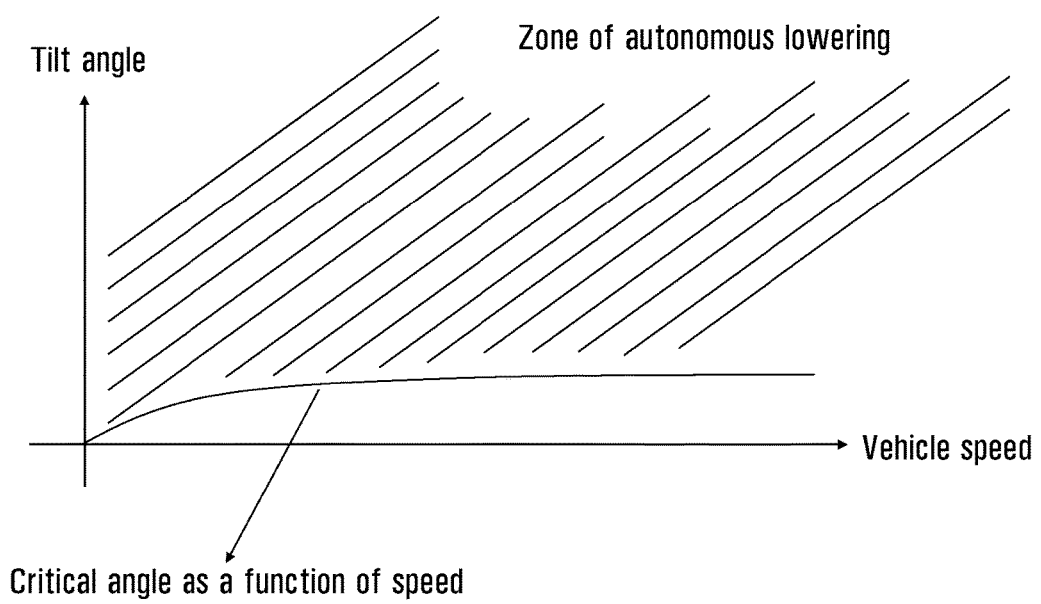
FIG. 7C is another example graphical representation similar to that of FIG. 7B but illustrating a different dependency of the critical angle on the vehicle speed.

The special case where [condition 1]=[the tracked vehicle 10 is moving relative to the ground 88 above a threshold speed] AND [condition 2]=[the dump box 300 is inclined by a tilt angle greater than a speed-dependent critical angle] is illustrated in FIG. 7B or FIG. 7C, where for any given speed, there exists a critical angle such that if the tilt angle is above the critical angle, autonomous lowering of the dump box 300 is triggered. Clearly, in this example, the critical angle is a dynamic function of the speed, i.e., as the speed of the tracked vehicle 10 varies, so will the critical angle that would cause the overall condition to be met. The relationship between the critical angle and the speed may be stored in the data memory 68. FIG. 7B shows a critical angle that falls with speed, whereas FIG. 7C shows a critical angle that rises with speed.

Other conditions can be contemplated in addition to those above, in order to form the overall condition, using any combination of Boolean operators, including but not limited to:

[condition 3]=[a payload weight of the dump box 300 is greater than a threshold weight]
[condition 4]=[the aforementioned critical angle has been exceeded continuously for more than a critical number of seconds]
[condition 5]=[the user's seat belt is engaged]
[condition 6]=[there is no object under the dump box]
[condition 7]=[the door of the cab is closed]
[condition 8]=[the upper frame is not parallel with the upper structure 32, i.e., has not been rotated back to its original front-back alignment]
[condition 9]=[the lower/raise command input device 46 has been used to try to raise the dump box 300 since the last time a dump box lowering cycle has been carried out]
[condition 10]=[any one or more of the above conditions or other conditions persisting for more than a certain duration]

Still further examples of conditions that may be used to form the overall condition will appear to those of skill in the art.

Also, in some cases, the conditions may be combined into the overall condition using other Boolean operators, such as OR, NOT and XOR.

Thus, among the various aspects that have disclosed is a vehicle computer configured to send a signal to the lifting unit 38 to carry out a lowering cycle of the work implement (e.g., dump box 300) in case the vehicle computer determines that a set of conditions has been met, wherein the set of conditions includes: (i) a movement characteristic of the tracked vehicle 10 exceeds a threshold; and the lower/raise command input device 46 has been actioned by a type of action associated with an attempt to raise the work implement since carrying out the most recent lowering cycle of the work implement.

Dump Box Control Algorithm (Version 2)

Another specific non-limiting embodiment of the dump box control algorithm will now be described in greater detail with reference to FIGS. 11 and 12. As conceptualized in FIG. 11, signals generated as a result of operator control of the input devices, signals generated by the sensors 202, and data stored in the data memory 68, are processed by the dump box control algorithm running on the ECU 60 in order to produce a variety of output signals.

In this example, the signals generated as a result of operator control of the input devices and that are used by this version of the dump box control algorithm may include the lower/raise signal 806 produced as a result of operator control of the lower/raise command input device 46.

The signals generated by the sensors 202 and that are used by this version of the dump box control algorithm may include a movement signal 810, which is received from the movement sensor 204.

As for the output signals produced by execution of the dump box control algorithm, these may include:

- A tilt indicator signal 802, which may activate a tilt indicator output 803 on the user vehicle operator interface 78 (including the dump box control center 48). For example, the tilt indicator output 803 may comprise a light, a display icon or a loudspeaker. This operator-destined output provides an indication to the operator of whether the dump box 300 is at rest versus being at least partly raised, or the precise extent to which it is raised. In some embodiments, the tilt indicator signal 802 causes the tilt indicator output 803 to flash intermittently, at an intensity that is bright enough to be visible from the driver's seat in broad daylight and/or is positioned in such a way on the vehicle operator interface 78 so as to be unobstructed by the steering unit 40. An intensity of the tilt indicator output 803 may be controlled electronically by the ECU 60, and may be adjusted based on ambient light (measured by one of the sensors 202) and therefore the intensity of the resulting illumination may be dimmed during low ambient light (e.g., nighttime) and brightened during daytime hours. In other embodiments, the tilt indicator output 803 is a numerical display that displays a value conveyed by the tilt indicator signal 802.
- The dump box control signal 804, which is fed to the lifting unit 38. The dump box control signal 804 may encode or represent a command to change (increase or decrease) the tilt angle of the dump box. The magnitude of the dump box control signal 804 may depend on the target tilt angle $\Theta_D$ (which may have been entered by the operator via the target tilt angle command input device 610).

Figure 11:
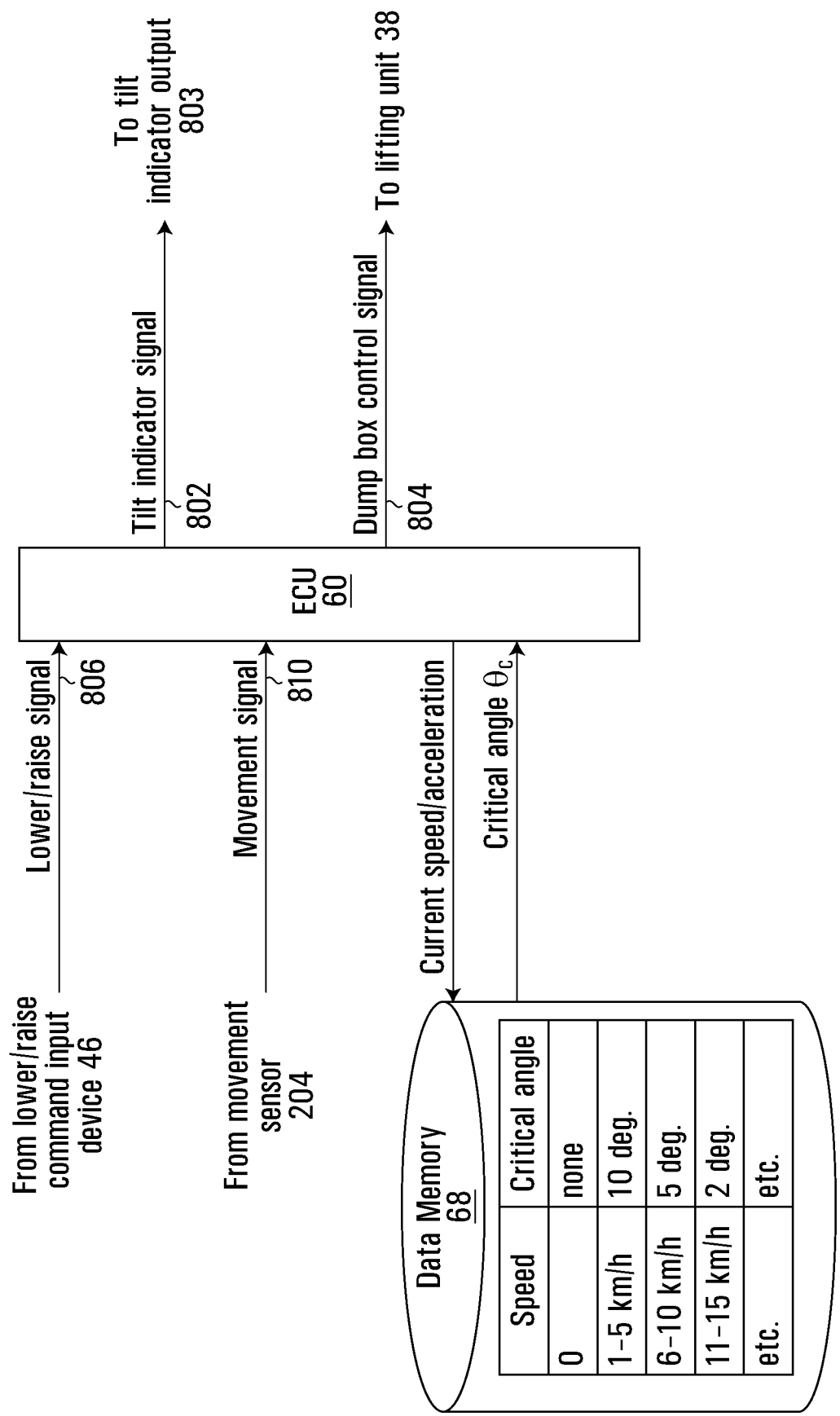
FIG. 11 is a block diagram representing a dump box control algorithm for providing electronic control of the lifting unit, in accordance with another non-limiting embodiment.
Figure 12:
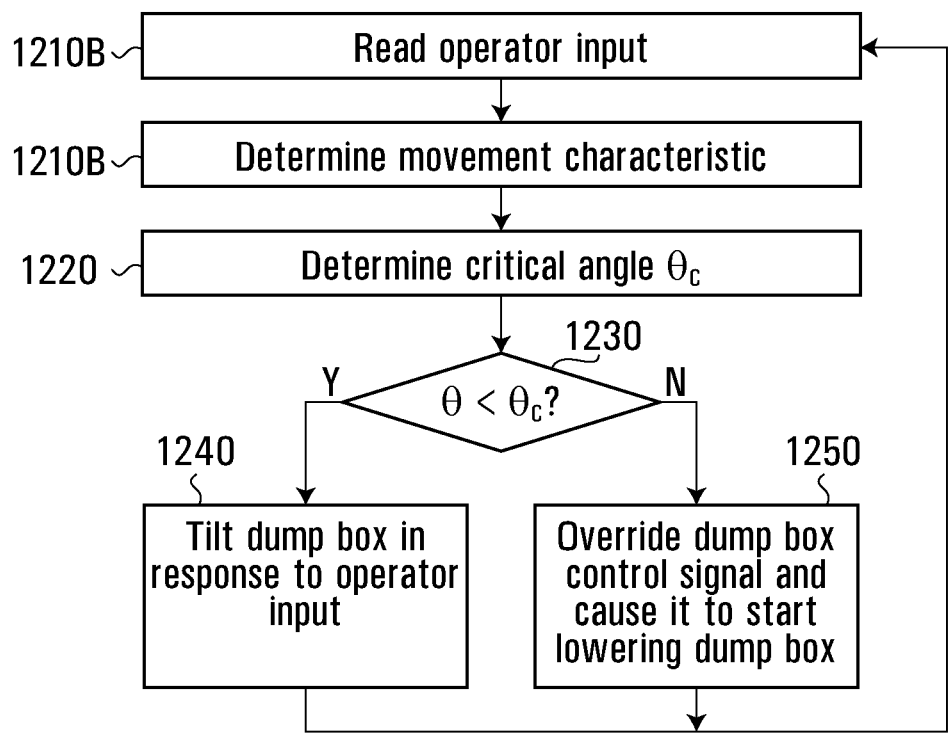
FIG. 12 is a flowchart showing specific operation of the dump box control algorithm, in accordance with another non-limiting embodiment.

In addition, the dump box control algorithm has access to the data memory 68, which may store an association between associated value sets, for example speed values/ranges and associated critical angles (as illustrated in FIG. 11), or acceleration/angle pairs and associated critical speeds.

As such, for example, the dump box control algorithm may determine a speed or acceleration based on the movement signal 810, then query the data memory 68 on the basis of the determined speed or acceleration to obtain a critical angle, which is then used for comparison purposes as will now be described with further reference to the flowchart FIG. 12.

It should be appreciated that the order of the various steps below may be changed, or certain steps may be carried out in parallel.

At step 1210A, "current tilt angle" $\Theta$ of the dump box 300 is determined.

The current tilt angle $\Theta$ can be a "measured tilt angle" obtained using feedback based on measurements from an external sensor such as the dump box inclinometer 207 mentioned herein above.

Alternatively, the current tilt angle $\Theta$ may be an "open-loop tilt angle" obtained in a feedforward way based on operator inputs, specifically from the lower/raise signal 806. For example, the operator may move the lower/raise command input device 46 in a certain direction thereby signaling an attempt at raising or lowering the dump box 300. For example, if the lower/raise command input device 46 is implemented as a joystick, then based on the amount of pressure applied to the joystick (defining a joystick maneuver), the direction of such pressure and the duration of the application of such pressure, together with a response curve 1710 (see FIG. 17A) of the dump box 300 (which may be stored in another section of the data memory 68), the ECU 60 may calculate the open-loop tilt angle of the dump box 300.

It should be appreciated that the open-loop tilt angle may differ from the measured tilt angle, and either or both may differ from the true tilt angle of the dump box 300. For example, the dump box inclinometer 207 used to obtain the measured tilt angle may be accurate to within X degrees. This could mean that if the true tilt angle is at X/2 degrees, the dump box inclinometer 207 may produce a reading of zero. For its part, the open-loop tilt angle is computed based the lower/raise signal 806 produced by movement of the joystick and will not be zero, since some movement of the joystick was needed to tilt the dump box 300.

To take a specific example, consider the situation where X=2 degrees, where the dump box 300 is at rest and then the lower/raise command input device 46 is accidentally hooked by the operator's jacket so that the dump box 300 becomes tilted to a true tilt angle of 0.9 degrees. Given its accuracy constraints, the dump box inclinometer 207 might produce a reading of zero degrees (i.e., a measured tilt angle of 0), whereas the open-loop tilt angle would be greater than zero because it is based on the lower/raise signal 806 produced by the lower/raise command input device 46. As such, the open-loop tilt angle more accurately reflects the true tilt angle than does the measured tilt angle. Therefore, deciding to trigger lowering of the dump box 300 based on the open-loop tilt angle may in some cases be preferable, as it may "catch" situations that might not be reflected in the measured tilt angle (and especially if there is no dump box inclinometer in the first place).

At step 1210B, the current speed, acceleration or other movement characteristic is obtained based on the movement signal 810. This may involve a mathematical computation such as averaging, filtering and/or derivation.

At step 1220, the "critical angle" is determined. The critical angle is an angle that may be a function of the current speed, acceleration or other movement characteristic of the tracked vehicle 10 as obtained at step 1210B. In some embodiments, the critical angle, denoted $\Theta_C$, may represent a tilt angle that should not be exceeded so as to avoid the potential for serious damage (e.g., to the upper structure 32, bearing, dump box 300, lifting unit 38 etc.) if the tracked vehicle 10 were to continue moving at its current speed. The critical angle $\Theta_C$ may be determined analytically or empirically. The critical angle $\Theta_C$ may have a tolerance margin such that it is lower than the tilt angle at which damage would actually occur. The critical angle $\Theta_C$ may be obtained from the data memory 68 in response to supplying to the data memory 68 the current speed, acceleration or other movement characteristic (obtained at step 1210B).

It should be appreciated that in some embodiments, the critical angle $\Theta_C$ may be zero at speeds above a certain threshold speed, and undefined for lower speeds, meaning that low-speed crawling may be permitted with the dump box 300 raised, but once the speed of the tracked vehicle 10 exceeds the threshold speed, autonomous lowering of the dump box 300 is triggered. In still other embodiments, the critical angle $\Theta_C$ may be zero at all non-zero speeds, meaning that any movement with a raised dump box 300 will trigger autonomous lowering of the dump box 300.

It should also be appreciated that all tilt angles (e.g., current tilt angle, critical angle) can be expressed in terms of a number of angular degrees or can be equivalently expressed as a linear distance (e.g., in cm or mm) by which a portion of the dump box 300 has been raised from its rest position.

At step 1230, the current tilt angle $\Theta$ is compared to the critical angle $\Theta_C$.

If the current tilt angle $\Theta$ is less than the critical angle $\Theta_C$, then the next step is step 1240, and the operator is allowed to control the dump box 300 normally, as long as the current tilt angle $\Theta$ remains less than the critical angle $\Theta_C$. During this period, the dump box control signal 804 is coupled to the operator-induced lower/raise signal 806. The algorithm returns to step 1210A.

However, if the current tilt angle $\Theta$ is greater than the critical angle $\Theta_C$, the next step is step 1250, whereby operator control of the dump box 300 is overridden. Specifically, the dump box control algorithm now takes control of the dump box control signal 804 (decouples it from the lower/raise signal 806) and begins autonomous lowering of the dump box 300 towards the rest position. The rationale for doing so is that the current tilt angle $\Theta$ is too high, and this may expose the upper structure 32, the dump box 300, the lifting unit 38 and the pivotable connection 36 to damage at the vehicle's current speed. Of course, a performance margin could be built in so that the critical angle $\Theta_C$ does not represent the actual maximum tilt angle before risking severe damage, but rather one or several degrees lower. The dump box control algorithm returns to step 1210A.

It should be appreciated that lowering of the dump box 300 at step 1250 may occur in accordance with a lowering cycle. Characteristics of the lowering cycle, which may be programmable, may be stored in the data memory 68 and accessed by the dump box control algorithm being executed by the ECU 60. For example, the lowering cycle may be characterized by segments, each defining an increment of angular (or linear) distance and/or time and/or angular speed of lowering, together with an optional pause between segments.

The segment may define values of the dump box control signal 804 that commands lowering (e.g., downward pivoting) of the dump box 300 towards the rest position at a rate of Y degrees per second for a total of X seconds (for a total angular distance of X*Y degrees) and then pause for Z seconds. This may then be repeated W segments. The values of X, Y and Z may be constant for each of the W segments, or they may be different for each segment. In a simple example where the values of X, Y and Z are constant for each segment of the sequence, the total swept angle of lowering is equal to X*Y*W and the total time it takes to execute the complete sequence is (X+Z)*W.

The values of X, Y, Z and W can be determined based on operational considerations and stored in the data memory 68, as shown in FIG. 17B. For example, again assuming X, Y and Z are constant for each segment of the sequence, if the maximum tilt angle of the dump box 300 is 80 degrees and X is equal to 2 seconds and Y is equal to 0.5 degrees per second, then complete lowering of the dump box 300 will be guaranteed to occur when W=80 segments are carried out, with a possible pause between segments. It should be appreciated that the duration of the pause can be user-defined via the vehicle operator interface 78, or it can be a default factory setting. It is noted that complete lowering of the dump box 300 will be guaranteed to occur once the lowering cycle is complete, even if the current tilt angle $\Theta$ is an inaccurate reflection of the true tilt angle, since the lowering cycle is based on the maximum tilt angle. Once the lowering cycle is complete, the true tilt angle will be zero, and the current tilt angle $\Theta$ can be reset to zero.

Consider now the case where the lower/raise command input device 46 (e.g., the joystick) has been actioned by an external action to attempt to raise the dump box 300 since completing of the most recent dump box lowering cycle. In this case, even where actioning of the joystick is ever so slight, or accidental, the dump box 300 may have been raised to a non-zero tilt angle, possibly unbeknownst to the operator. This would be reflected in the open-loop tilt angle being grater than zero, even if the change would not be perceptible to an inclinometer such as the dump box inclinometer 207. As such, by comparing the open-loop tilt angle to the critical angle $\Theta_C$ for the current speed (or to zero when the speed of the tracked vehicle 10 is greater than a threshold speed), the dump box lowering cycle will be re-initiated and can preserve longevity of the frame, the pivotable connection 36 and the lifting unit 38. In other words, monitoring the actioning of the joystick following completion of the most recent lowering cycle provides a key variable in determining whether to re-initiate the lowering cycle, irrespective of the presence, absence or accuracy of an external sensor (e.g., the dump box inclinometer 207) for detecting the measured tilt angle.

Thus, among the various aspects that have been disclosed is a vehicle computer (e.g., ECU 60) configured to send a signal to the lifting unit 38 to carry out a lowering cycle of the work implement (e.g., dump box 300) based at least on an open-loop tilt angle of the work implement, the open-loop tilt angle being computed by monitoring the signal produced by the lower/raise command input device 46.

Another one of the various aspects that has been disclosed is a vehicle computer configured to send a signal to the lifting unit 38 to carry out a lowering cycle of the work implement in case the vehicle computer determines that a set of conditions has been met, wherein the set of conditions includes (i) a movement characteristic of the tracked vehicle 10 exceeds a first non-zero threshold (e.g., the tracked vehicle 10 is moving faster than a certain speed); and (ii) the tilt angle of the work implement exceeds a second non-zero threshold (the critical angle).

Figure 13:
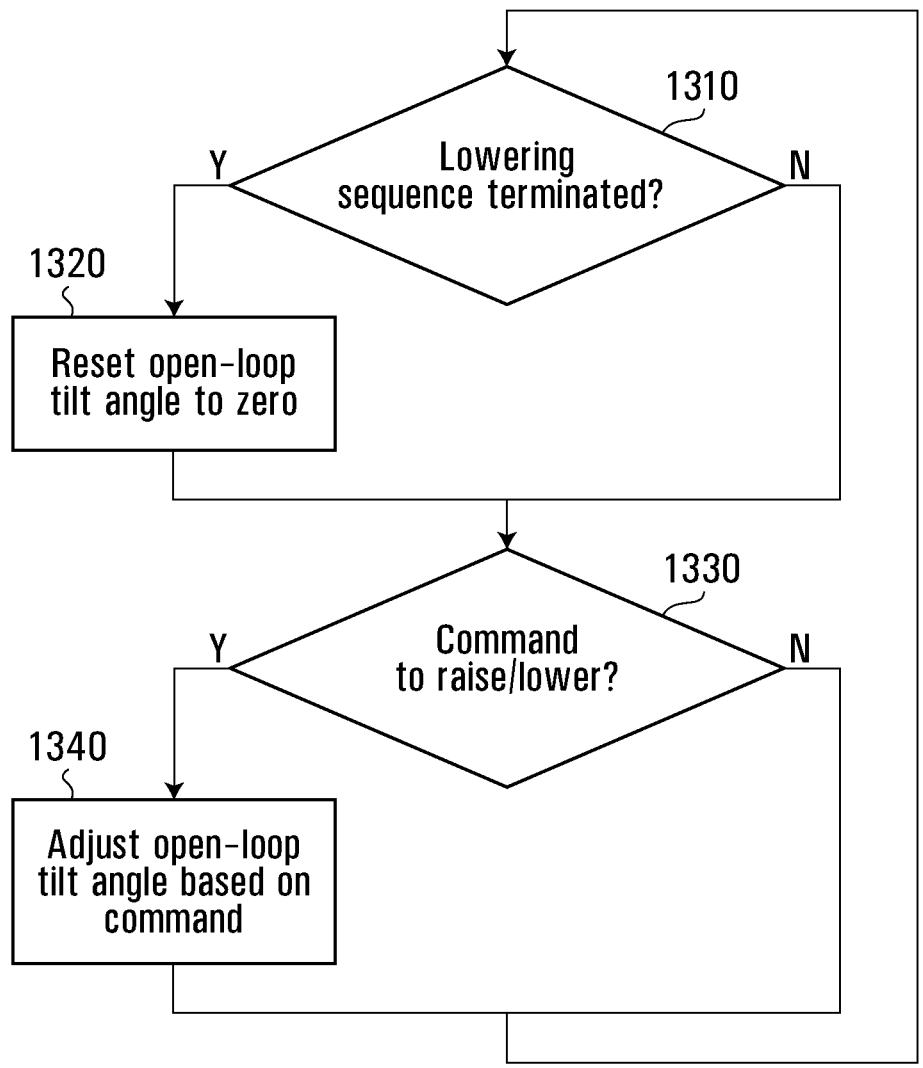
FIG. 13 is a flowchart showing steps in an open-loop tilt angle estimation process, in accordance with a non-limiting embodiment.

FIG. 13 shows an open-loop tilt angle estimation process that may be executed by the ECU 60 as part of step 1210A. At step 1310, the ECU 60 checks whether the lowering cycle has just terminated. If so, the open-loop tilt angle is reset to zero (step 1320) as it is guaranteed that the true tilt angle is zero once the lowering cycle is over. In either case, the process then proceeds to step 1330. Here, the ECU 60 determines whether a command to raise or lower the dump box 300 has been issued, based on monitoring the lower/raise signal 806. If yes, the next step is 1340, where the open-loop tilt angle is adjusted either upwards or downwards, depending on the lower/raise signal 806. If the open-loop tilt angle was already zero, then if the lower/raise signal 806 is a command to lower the dump box 300, then the open-loop tilt angle will be kept at zero. In either case, the open-loop tilt angle estimation process returns to step 1310.

It should be appreciated that the lifting unit 38 (which is for connection to the frame and to the work implement, and which is configured to controllably raise or lower at least part of the work implement), the input device 46 (which is actionable by a first type of external action associated with an attempt to raise the work implement and by a second type of external action associated with an attempt to lower the work implement) and the ECU 60 (which is connected to the input device 46 and configured to send a signal to the lifting unit 38 to carry out a lowering cycle of the work implement in case the ECU 60 determines that a set of conditions has been met) together may be referred to as a "work implement tilt control system" for the tracked vehicle 10. Operationally, the ECU 60 sends a signal to the lifting unit 38 to carry out a lowering cycle of the dump box in case it determines that (i) a movement characteristic (e.g., speed or acceleration) of the tracked vehicle 10 exceeds a threshold and (ii) the input device 46 has been actioned by a type of external action (e.g., a raising action) since the most recent lowering cycle of the dump box 300 has been carried out.

Dump Box Control Algorithm (Version 3)

Figure 10:
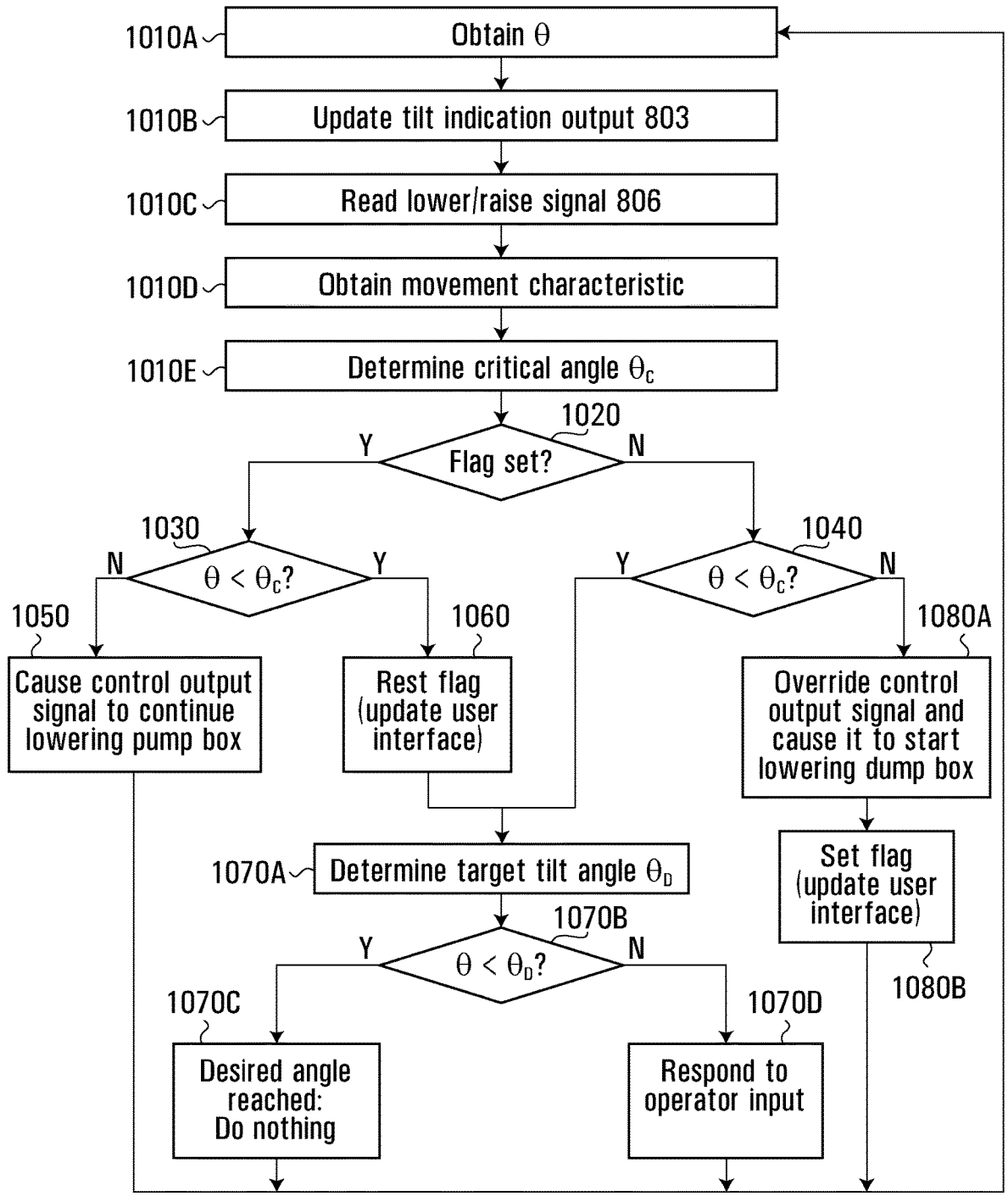
FIG. 10 is a flowchart showing specific operation of the dump box control algorithm, in accordance with a non-limiting embodiment.

Another specific non-limiting embodiment of the dump box control algorithm will now be described in greater detail with reference to FIGS. 8 and 10. As conceptualized in FIG. 8, signals produced by the operator input devices, signals produced by the sensors 202, and data stored in the data memory 68, are processed by the dump box control algorithm running on the ECU 60 in order to control a variety of outputs.

In this example, examples of signals produced by the operator input devices and that are used by this version of the dump box control algorithm may include the lower/raise signal 806 produced as a result of operator control of the lower/raise command input device 46 of the dump box control center 48.

Examples of signals produced by the sensors 202 and that are used by this version of the dump box control algorithm may include:

The movement signal 810, which is received from the movement sensor 204.

The measured tilt angle signal 808, which is received from the dump box inclinometer 207.

As for the output signals produced by execution of the dump box control algorithm, these may include:

The tilt indicator signal 802. As described above, the tilt indicator signal 802 may activate the tilt indicator output 803 on the user vehicle operator interface 78 (including the dump box control center 48). This operator-destined output provides an indication to the operator of whether the dump box 300 is at rest versus being at least partly raised, or the precise extent to which it is raised. It is recalled that in some embodiments, the current tilt angle may be the measured tilt angle (from the measured tilt angle signal 808) or the open-loop tilt angle (computed based on monitoring of the lower/raise signal 806, see above description of FIG. 13).

The dump box control signal 804, which is provided to the lifting unit 38. Control may be open-loop or feedback. In the case of open-loop control, the dump box control algorithm computes an angle deemed to be required to arrive at the target tilt angle $\Theta_D$ (which may be specified by the operator via the vehicle operator interface 78). The dump box control algorithm then produces the dump box control signal 804 based on the value of this angle. In the case of feedback control, the dump box control signal 804 may be indicative of a change in the tilt angle. Upon application of the change, the current tilt angle $\Theta$ is compared to the target tilt angle $\Theta_D$ to determine an error, and the dump box control signal 804 is then readjusted so as to minimize the error.

Figure 8:
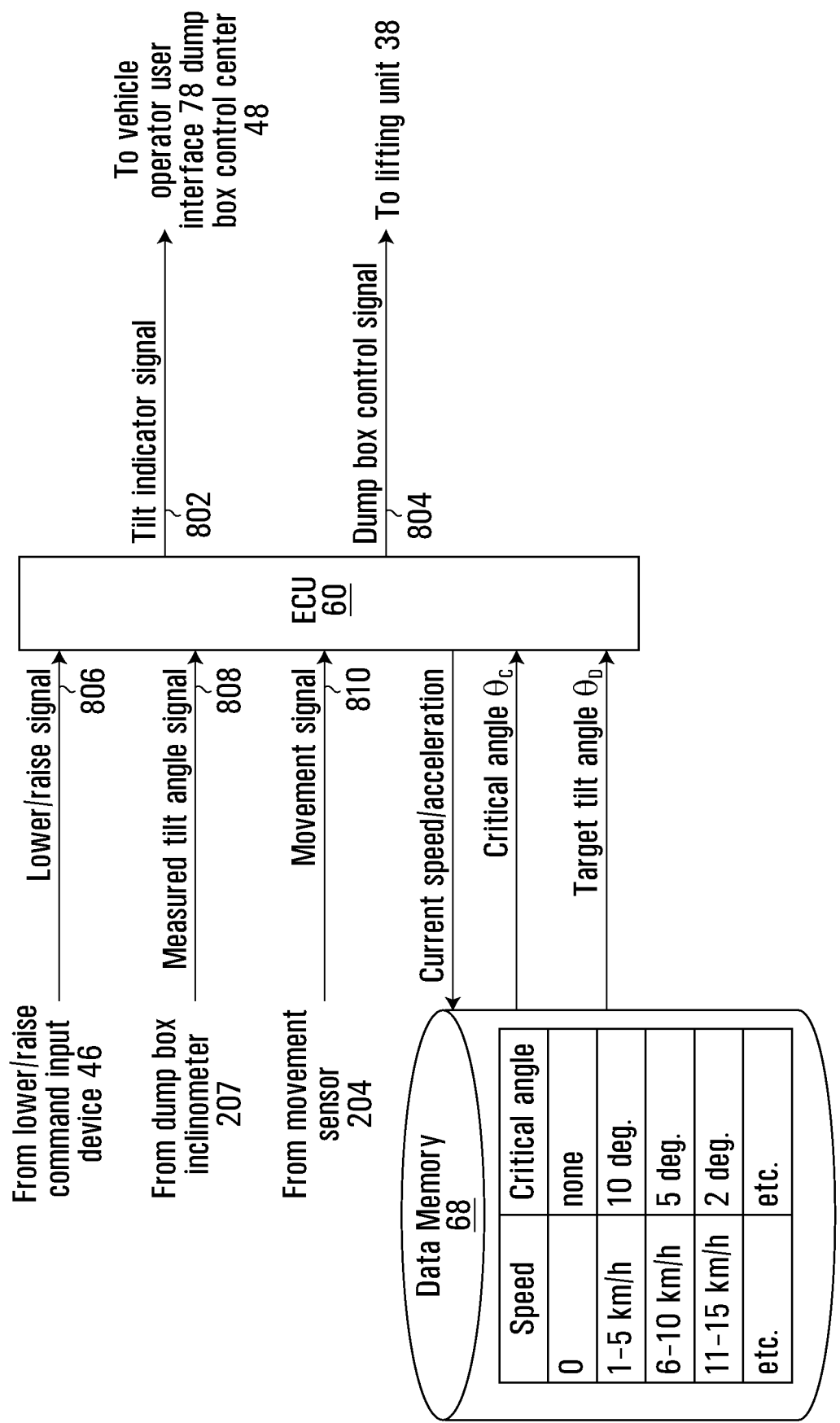
FIG. 8 is a block diagram representing a dump box control algorithm for providing electronic control of the lifting unit, in accordance with a non-limiting embodiment.

In addition, the dump box control algorithm has access to the data memory 68, which may store an association between associated value sets, for example speed values/ranges and associated critical angles (as illustrated in FIG. 8), or acceleration/angle pairs and associated critical speeds. Also, the data memory 68 may store the target tilt angle $\Theta_D$ obtained from the target tilt angle command input device 610.

As such, for example, the dump box control algorithm may compute a speed or acceleration based on the movement signal 810, then query the data memory 68 on the basis of the speed or acceleration to obtain a critical angle $\Theta_C$, which is then used for comparison purposes as will now be described with further reference to the flowchart FIG. 10.

It should be appreciated that the order of the various steps below may be changed, or certain steps may be carried out in parallel.

At step 1010A, the current tilt angle $\Theta$ is obtained, e.g., read from the dump box inclinometer 207 or computed based on the lower/raise signal 806.

At step 1010B, the information conveyed by the vehicle operator interface 78 may be updated. For example, if the current tilt angle $\Theta$ has changed, then the vehicle operator interface 78 may be prompted to change the number of degrees displayed by the tilt indicator output 803.

At step 1010C, the lower/raise signal 806 is read and the target tilt angle $\Theta_D$ is obtained from the data memory 68.

At step 1010D, the current speed, acceleration or other movement characteristic is obtained based on the movement signal 810. This may involve a mathematical computation such as averaging, filtering and/or derivation.

At step 1010E, the critical angle $\Theta_C$ is determined. The critical angle $\Theta_C$ may be obtained from the data memory 68 in response to supplying to the data memory 68 the current speed, acceleration or other movement characteristic (obtained at step 1010D).

It should be appreciated that in some embodiments, the critical angle $\Theta_C$ may be zero at speeds above a certain threshold speed, and undefined for lower speeds, meaning that low-speed crawling may be permitted with the dump box 300 raised, but once the speed is above the threshold speed, autonomous lowering of the dump box 300 is triggered. In still other embodiments, the critical angle $\Theta_C$ may be zero at all non-zero speeds, meaning that any movement with a raised dump box will trigger its autonomous lowering.

At step 1020, an internal flag is checked. This internal flag represents whether the dump box 300 is already in the process of being autonomously lowered. This flag could be set at any given time during operation of the tracked vehicle 10, although it would not be set the very first time that this flowchart is executed. If the flag has been set, the next step is step 1030; otherwise, the next step is step 1040.

At step 1040, the current tilt angle $\Theta$ is compared to the critical angle $\Theta_C$. If the current tilt angle $\Theta$ is less than the critical angle $\Theta_C$, then the next step is step 1070A, and the operator is allowed to control the dump box 300 normally. For example, and as illustrated at step 1070A, the target tilt angle $\Theta_D$ is obtained. The next step is step 1070B, where a comparison is made between the target tilt angle $\Theta_D$ and the current tilt angle $\Theta$. If the current tilt angle $\Theta$ is equal to the target tilt angle $\Theta_D$, then step 1070C is followed, which essentially amounts to no particular action being required involving the lifting unit 38. The algorithm then returns to step 1010A. However, if the current tilt angle $\Theta$ is not equal to the target tilt angle $\Theta_D$, then step 1070D is executed, whereby a suitable dump box control signal 804 is generated based on whether the operator is attempting to lower or raise the dump box 300 and the difference between the current tilt angle $\Theta$ and the target tilt angle $\Theta_D$. The dump box control signal 804 is supplied to the lifting arm 38, resulting in operator-controlled movement of the dump box 300. The algorithm returns to step 1010A.

Now, returning to the comparison of the current tilt angle $\Theta$ to the critical angle $\Theta_C$ at step 1040, if the current tilt angle $\Theta$ was found to be greater than the critical angle $\Theta_C$ (and recalling that there is no ongoing lowering of the dump box 300 due to the "no" path having ben taken after step 1020), the next step is step 1080A. Here, operator control of the dump box 300 is overridden by the dump box control algorithm. Specifically, the algorithm now takes control of the dump box control signal 804 and begins autonomous lowering of the dump box 300 towards the rest position. The rationale for doing so is that the current tilt angle $\Theta$ is too high, and may expose the upper structure 32, the dump box 300, the lifting unit 38 and/or the pivotable connection 36 to damage at the vehicle's current speed. Of course, a performance margin could be built in so that the critical angle $\Theta_C$ does not represent the actual maximum tilt angle before risking severe damage, but rather one or several degrees lower. The next step is step 1080B, where the internal flag is set, in order to indicate that the dump box 300 is in the process of being autonomously lowered. The algorithm returns to step 1010A.

With the internal flag being set, a subsequent pass through the algorithm will encounter a different result at step 1020, where a verification of the internal flag is done. Since the internal flag is set, the next step is step 1030, where the current tilt angle $\Theta$ is compared to a reference angle $\Theta_R$. If the current tilt angle $\Theta$ is greater than the reference angle $\Theta_R$, then the next step is step 1050. Here, autonomous lowering of the dump box control unit 32 continues, as the current tilt angle $\Theta$ is still considered to be too high. The algorithm returns to step 1010A.

If, on the other hand, step 1030 reveals that the current tilt angle $\Theta$ is not greater than the reference angle $\Theta_R$, this implies that the current tilt angle $\Theta$ is at a satisfactory level and the internal flag can be reset. This is done at step 1060, and then the operator is allowed to control the dump box 300 normally. For example, and as illustrated at step 1070A, the algorithm may determine the target tilt angle $\Theta_D$. The next step is step 1070B, where a comparison is made between the target tilt angle $\Theta_D$ and the current tilt angle $\Theta$. If the current tilt angle $\Theta$ is equal to the target tilt angle $\Theta_D$, then step 1070C is followed, which essentially amounts to no particular action being required involving the lifting unit 38. The algorithm then returns to step 1010A. However, if the current tilt angle $\Theta$ is not equal to the target tilt angle $\Theta_D$, then step 1070D is executed, whereby a suitable dump box control signal 804 is generated based on whether the operator is attempting to lower or raise the dump box 300. The dump box control signal 804 is supplied to the lifting arm 38, resulting in operator-controlled movement of the dump box 300. The algorithm returns to step 1010A.

It should be appreciated that in some embodiments, the reference angle $\Theta_R$ may be equal to the critical angle $\Theta_C$. In this case, autonomous lowering of the dump box is triggered and stopped at the same angle. As such, autonomous lowering of the dump box 300 may cease as soon as the current tilt angle $\Theta$ is less than the reference angle $\theta_R$ (in this case equal to the critical angle $\theta_C$), which is the angle used to trigger autonomous lowering of the dump box 300. Alternatively, the reference angle $\Theta_R$ may be different from (e.g., less than) the critical angle $\Theta_C$. In this case, autonomous lowering of the dump box 300 is triggered at the critical angle $\Theta_C$ and stopped at the reference angle $\Theta_R$. As such, autonomous lowering of the dump box 300 will not cease until the tilt angle $\Theta$ is less than reference angle $\Theta_R$, which can be lower than the critical angle $\Theta_C$ used to trigger autonomous lowering of the dump box 300. In some embodiments, the critical angle $\Theta_C$ may be non-zero and the reference angle $\Theta_R$ may be zero. This would mean that once lowering of the dump box 300 (i.e., movement about the pivot connection 36 towards the rest position) has begun, it will not end until the rest position is reached (i.e., $\Theta=\Theta_R=0$). In such an embodiment, after the dump box 300 has begun to pivot towards the rest position, the ECU 60 may be configured to control the lifting unit 38 to cause the dump box to continue to pivot towards the rest position until the dump box 300 reaches the rest position, even if in the meantime the current tilt angle $\Theta$ falls below $\Theta_C$ (the critical angle for purposes of triggering the dump box's automatic descent).

It should also be appreciated that triggering a dump box lowering cycle can be done for different durations and total angles, depending on the tilt angle of the dump box at the time of triggering. That is to say, consider that the two scenarios where tracked vehicle 10 is at rest and that the tilt angle is measured to be either 1 degree or 30 degrees. If the tracked vehicle 10 starts moving and exceeds the threshold speed, for example, it is envisaged that the ECU 60 could cause the complete dump box lowering cycle to be carried out for the case of a 30 degree tilt angle, but only a partial dump box lowering cycle (e.g., half or ⅓) in the case of a 1 degree tilt angle. In each case, a guarantee is needed that the dump box will be in the rest position once the lowering cycle is over, irrespective of any external tilt angle measurements, as they may have a margin of error. Yet if they are considered to be accurate within this margin of error, this will be accurate enough to reliably choose between two dump box lowering cycles for two different ranges of measured tilt angles (one for small angles (e.g., less than a chosen angle) and one for large angles e.g., greater than the chosen angle)); this will result in time savings for smaller angles with no sacrifice as to the guarantee that the dump box is at rest on the upper structure 32. Of course, additional granularity in terms of the number of dump box lowering cycles can be implemented.

In an alternative embodiment of step 1010D (or 1210B), in addition to obtaining a movement characteristic of the tracked vehicle 10 (e.g., speed or acceleration), a slope of travel of the tracked vehicle 10 may be obtained from the vehicle inclinometer 206 and/or a weight of the payload in the dump box 300 may be obtained from a scale 216. These additional data elements may also have an impact on determination of the critical angle $\Theta_C$ at step 1010E (or 1220). For example, heavier loads and/or greater inclines may reduce the critical angle $\Theta_C$.

Tilt Indicator Control

Figure 14:
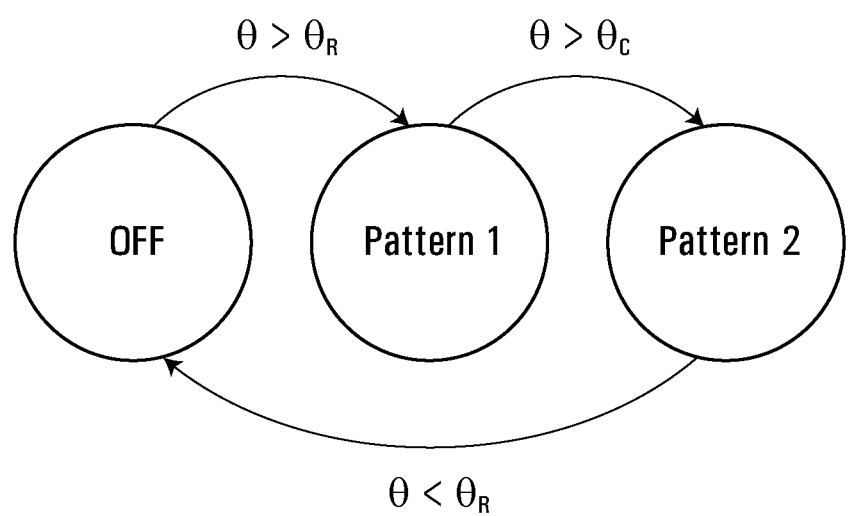
FIG. 14 shows a finite state machine illustrative of a tilt indicator control process that may be carried out by an ECU, in accordance with a non-limiting embodiment.

Another process that may be carried out by the ECU 60 includes a tilt indicator control process, which may output the tilt indicator signal 802 that activates the tilt indicator output 803. The tilt indicator control process may be useful for conveying an intuitive message to the operator based on the current tilt angle $\Theta$, the critical angle $\Theta_C$, the reference angle $\Theta_R$, and knowledge of whether a lowering cycle is in progress. In particular, the tilt indicator signal 802 can be controlled so as to put the tilt indicator output 803 into an Off state in one of several active states corresponding to respective illumination patterns (Pattern 1, Pattern 2). Transitions between illumination patterns can be governed by a finite state machine (FSM), which is now described with additional reference to FIG. 14.

It is seen that by default, the tilt indicator output 803 is in the Off state. The tilt indicator output 803 then enters the Pattern 1 state from the Off state in response to determining that the current tilt angle $\Theta$ is greater than the reference angle $\Theta_R$. This signifies that the dump box 300 is not in the rest position, but this does not necessarily imply an undesirable or hazardous situation (as the vehicle may be stationary, for example). However, in response to determining that the current tilt angle $\Theta$ is greater than the critical angle $\Theta_C$, the lowering cycle is started as described above, and the tilt indicator output 803 enters the Pattern 2 state from the Pattern 1 state. The tilt indicator output 803 remains in this state until the current tilt angle $\Theta$ is not greater than the reference angle $\Theta_R$. Note that the reference angle $\Theta_R$ could be zero, meaning that the tilt indicator output 803 could enter the Pattern 1 state as soon as the dump box 300 is raised even slightly.

It should be appreciated that the illumination pattern in the Pattern 1 and Pattern 2 could be different to convey to the operator the behavior of the dump box 300 in an intuitive way. For example, in the off state, the tilt indicator output 803 could be off; in the Pattern 1 state, the tilt indicator output 803 could be on; and in the Pattern 2 state, the tilt indicator output 803 could be flashing. Of course, other possibilities, including the conception of additional illumination patterns and numbers of states (coupled with audio effects or the use of colors or on-screen messages), may become apparent to those of ordinary skill in the art and are within the scope of the present disclosure. For example, if a pause is encountered during a lowering cycle, the tilt indicator output 803 can be made to enter a Pattern 3 state during which the tilt indicator output 803 is caused to flash at a different rate (e.g., slower) than in the Pattern 2 state.

Thus, among the various aspects that have disclosed is a vehicle computer configured to send a signal to the lifting unit 38 to carry out a lowering cycle of the work implement (e.g., dump box 300) in case the vehicle computer determines that a set of predetermined conditions has been met, the vehicle computer being further configured to cause the user interface to change the state of an output from a first state to a second state upon starting the lowering cycle, to change the state of the output from the second state to a third state upon completion of the lowering cycle, and to change the state of the output from the third state to the first state upon the condition having been met but the next lowering cycle not yet having begun.

Manual Override

In some cases, the reference angle $\Theta_R$ and/or the critical angle $\Theta_C$ can be additional examples of variables that are input by the operator. They may be entered by the operator choosing a selectable option from a set of options on a touchscreen of the vehicle operator interface 78 (including the dump box control center 48). The touchscreen is configured to convert the operator input into an electrical signal that conveys the reference angle $\Theta_R$ and/or the critical angle $\Theta_C$. This allows the operator to adjust and override the sensitivity of the dump box control algorithm.

Another example of operator input may be a dump box control override signal, provided via the vehicle operator interface 78 (including the dump box control center 48). This may constitute a user input which, when processed by the ECU 60, results in the ECU 60 not implementing the dump box control algorithm and, as a result, not overriding the dump box control signal 804.

Those of skill in the art will appreciate that the ECU 60 may be configured to control the lifting unit 38 to cause the dump box 300 to pivot towards the rest position in stepwise increments. The step size of the increments may be selected to be a function of a movement characteristic (e.g., speed or acceleration) of the tracked vehicle 10. The step size of the increments may be selected to also be a function of a current tilt angle $\Theta$ of the dump box 300. Also, the step size of the increments may be selected to be a function of a payload weight of the dump box 300.

Based on the foregoing, it should be appreciated that lowering the dump box 300 in response to detecting movement of the tracked vehicle 10 may protect the upper structure 32 by preventing frame warping and this may increase longevity of the upper structure 32, the lifting unit 38, the dump box 300 and/or other parts of the tracked vehicle 10.

Thus there has been described a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement and the work implement tilt control system also comprising an input device actionable by a first type of external action associated with an attempt to raise the work implement and by a second type of external action associated with an attempt to lower the work implement, wherein the method comprises: (i) determining if a set of conditions has been met; and (ii) in case the set of conditions has been met, sending a signal to the lifting unit to carry out a lowering cycle of the work implement; wherein the set of conditions includes: a movement characteristic of the tracked vehicle exceeds a threshold; and the input device has been actioned by the first type of external action since carrying out the most recent lowering cycle of the work implement.

There has also been described a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement and the work implement tilt control system also comprising an an input device configured to produce a signal indicative of an external action on the input device, the external action being associated with an attempt to raise or lower the work implement, wherein the method comprises: (i) a vehicle computer configured to send a signal to the lifting unit to carry out a lowering cycle of the work implement based at least on an open-loop tilt angle of the work implement, the open-loop tilt angle being computed by monitoring the signal produced by the input device; (ii) monitoring the signal produced by the input device; (iii) computing an open-loop tilt angle of the work implement from the signal produced by the input device; and (iv) sending a signal to the lifting unit to carry out a lowering cycle of the work implement based at least on the open-loop tilt angle of the work implement.

Also, there has been described a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably change a tilt angle of the work implement, wherein the method comprises: (i) determining if a set of conditions has been met; and (ii) in case the set of conditions has been met, sending a signal to the lifting unit to carry out a lowering cycle of the work implement; wherein the set of conditions includes: a movement characteristic of the tracked vehicle exceeds a first non-zero threshold; and the tilt angle of the work implement exceeds a second non-zero threshold.

There has also been described a method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement; the work implement tilt control system also comprising a user interface comprising (i) an input device configured to produce a signal indicative of an external action on the input device, the external action being associated with an attempt to raise or lower the work implement; and (ii) an output capable of acquiring a plurality of states, wherein the method comprises: (i) determining that a condition has been met,; (ii) in case the condition has been met, sending a signal to the lifting unit to carry out a lowering cycle of the work implement; and (iii) in case the condition having been met and the next lowering cycle has not yet begun, causing the user interface to change the state of the output from a first state to a second state upon starting the lowering cycle, to change the state of the output from the second state to a third state upon completion of the lowering cycle, and to change the state of the output from the third state to the first state.

The examples and language recited herein are intended for pedagogical purposes to aid the reader in understanding the principles of the disclosed embodiments and concepts, and are to be construed as being without limitation to such specifically recited examples and language. Moreover, statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be appreciated that certain adaptations and modifications of the described embodiments can be made. Therefore, the above discussed embodiments are to be considered illustrative and not restrictive. Also, it should be appreciated that additional elements that may be needed for operation of certain embodiments of the present disclosure have not been described or illustrated as they are assumed to be within the purview of the person of ordinary skill in the art. Moreover, any feature of any embodiment discussed herein may be combined with any feature of any other embodiment discussed herein in some examples of implementation. Moreover, certain embodiments of the present disclosure may be free of, may lack and/or may function without any element that is not specifically disclosed herein.

While example embodiments have been illustrated, those of skill in the art will appreciate that the scope of the invention is only to be limited by the claims appended hereto.

What is claimed is:

1. A work implement tilt control system for a tracked vehicle having a frame and a work implement mounted to the frame, the work implement tilt control system comprising:
   a lifting unit configured for connection to the frame and to the work implement, the lifting unit being configured to controllably raise or lower at least part of the work implement relative to the frame;
   an input device configured for operable coupling to the lifting unit and configured to be actionable by a first type of external action associated with an attempt to raise the work implement and by a second type of external action associated with an attempt to lower the work implement; and
   a vehicle computer configured to:
   (i) monitor a movement characteristic of the vehicle relative to a threshold;
   (ii) detect if the input device has been actioned by the first type of external action subsequent to a most recent lowering cycle;
   (iii) determine if the movement characteristic exceeds the threshold and if the input device has been actioned by the first type of external action subsequent to the most recent lowering cycle; and
   (iv) in response to determining that the movement characteristic exceeds the threshold and that the input device has been actioned by the first type of external action subsequent to the most recent lowering cycle, send a signal to the lifting unit to carry out a lowering cycle of the work implement.

2. The work implement tilt control system defined in claim 1, wherein to determine that the movement characteristic of the tracked vehicle exceeds the threshold, the vehicle computer is configured to read an output of at least one movement sensor to determine a speed of the tracked vehicle and to compare the speed to the threshold.

3. The work implement tilt control system defined in claim 1, wherein to determine that the movement characteristic of the tracked vehicle exceeds the threshold, the vehicle computer is configured to read an output of at least one movement sensor to determine an acceleration of the tracked vehicle and to compare the acceleration to the threshold.

4. The work implement tilt control system defined in claim 1, further comprising a pivotable connection that connects the at least part of the work implement to the frame and wherein the lifting unit is configured to controllably raise or lower the at least part of the work implement by angular movement about the pivotable connection.

5. The work implement tilt control system defined in claim 4, wherein the lifting unit comprises at least one lifting arm movable by hydrostatic pressure from a valve electronically controlled from the vehicle computer.

6. The work implement tilt control system defined in claim 1, wherein carrying out the lowering cycle of the work implement comprises sending a signal to the lifting unit to lower the work implement by an amount that is certain to put the work implement in a rest position relative to the frame.

7. The work implement tilt control system defined in claim 6, wherein in the rest position, the work implement is incapable of being further lowered.

8. The work implement tilt control system defined in claim 5, wherein sending the signal to the lifting unit to carry out the lowering cycle of the work implement comprises sending a signal to the lifting unit to lower the work implement by an amount that is certain to rest the work implement on the frame.

9. The work implement tilt control system defined in claim 5, wherein sending the signal to the lifting unit to carry out the lowering cycle of the work implement comprises sending a signal to the lifting unit to lower the work implement by an amount that is certain to put the work implement in a rest position, without measuring a tilt angle of the work implement.

10. The work implement tilt control system defined in claim 5, wherein sending the signal to the lifting unit to carry out the lowering cycle of the work implement comprises sending a signal to the lifting unit to lower the work implement in lowering increments separated by a pause.

11. The work implement tilt control system defined in claim 5, wherein sending the signal to the lifting unit to carry out the lowering cycle of the work implement comprises sending a signal to the lifting unit to lower the work implement in angular or time increments, unless the work implement is already in the rest position.

12. The work implement tilt control system defined in claim 5, wherein sending the signal to the lifting unit to carry out the lowering cycle of the work implement comprises sending a signal to the lifting unit to lower the work implement in angular or time increments separated by pauses.

13. The work implement tilt control system defined in claim 12, wherein at least a size of the angular or time increments or a duration of the pauses is selectable by an operator of the tracked vehicle.

14. The work implement tilt control system defined in claim 5, the signal being a first signal, the lowering cycle being a first lowering cycle, the work implement tilt control system further comprising a sensor for detecting whether the work implement is in a rest position, the sensor connected to the vehicle computer, the vehicle computer being further configured to send the first signal to the lifting unit to carry out the first lowering cycle of the work implement in case the vehicle computer also determines from the sensor that the work implement is in the rest position, and the vehicle computer being configured to send a second signal to the lifting unit to carry out a second lowering cycle of the work implement in case the vehicle computer determines that the set of conditions is met but also determines from the sensor that the work implement is not in the rest position.

15. The work implement tilt control system defined in claim 14, wherein the second lowering cycle lasts longer than the first lowering cycle.

16. The work implement tilt control system defined in claim 1, wherein the input device comprises a joystick.

17. The work implement tilt control system defined in claim 1, wherein the vehicle computer is configured to record instances of the lowering cycle of the work implement being carried out.

18. A tracked vehicle comprising the work implement tilt control system defined in claim 1.

19. The tracked vehicle defined in claim 18, further comprising a pair of track assemblies mounted on opposite lateral sides of the frame.

20. The tracked vehicle defined in claim 19, wherein the frame comprises an upper frame portion; a lower frame portion; and a connection unit coupled to the upper frame portion and to the lower frame portion, configured to allow rotation of the upper frame portion relative to the lower frame portion about an axis of rotation.

21. The tracked vehicle defined in claim 20, wherein the pair of track assemblies are mounted on opposite lateral sides of the lower frame portion.

22. The tracked vehicle defined in claim 20, wherein the work implement is mounted to the upper frame portion.

23. The tracked vehicle defined in claim 20, wherein the connection unit comprises a bearing.

24. The tracked vehicle defined in claim 19, further comprising a prime mover operatively coupled to the track assemblies to enable the tracked vehicle to travel on a ground.

25. The tracked vehicle defined in claim 24, further comprising a cab mounted to the frame.

26. The tracked vehicle defined in claim 18, further comprising at least one movement sensor for sensing movement of the tracked vehicle.

27. The tracked vehicle defined in claim 26, wherein the at least one movement sensor comprises an accelerometer for outputting a signal indicative of a measured acceleration of the tracked vehicle, wherein the movement characteristic of the tracked vehicle is deemed to exceed the threshold if an acceleration output by the accelerometer exceeds a threshold acceleration.

28. The tracked vehicle defined in claim 26, wherein the at least one movement sensor comprises a speedometer for outputting a signal indicative of a measured speed of the tracked vehicle, wherein the movement characteristic of the vehicle is deemed to exceed the threshold if a speed output by the speedometer exceeds a threshold speed.

29. The tracked vehicle defined in claim 28, wherein the set of conditions further includes a speed of the tracked vehicle exceeding the threshold speed for more than a threshold amount of time.

30. The tracked vehicle defined in claim 1, wherein the work implement is a dump box.

31. The tracked vehicle defined in claim 30, further comprising a scale connected to the vehicle computer, the scale configured for generating a signal indicative of a weight of the dump box, wherein the set of conditions further includes the weight of the dump box exceeding a threshold weight.

32. A method for execution by a computer of a work implement tilt control system for a tracked vehicle having a frame and a work implement mounted to the frame, the work implement tilt control system comprising a lifting unit for connection to the frame and to the work implement, the lifting unit being configured to controllably raise or lower at least part of the work implement and the work implement tilt control system also comprising an input device actionable by a first type of external action associated with an attempt to raise the work implement and by a second type of external action associated with an attempt to lower the work implement, wherein the method comprises the steps of:
- (i) monitoring a movement characteristic of the vehicle relative to a threshold;
- (ii) detecting if the input device has been actioned by the first type of external action subsequent to a most recent lowering cycle;
- (iii) determining if the movement characteristic exceeds the threshold and if the input device has been actioned by the first type of external action subsequent to the most recent lowering cycle; and
- (iv) in response to determining that the movement characteristic exceeds the threshold and that the input device has been actioned by the first type of external action subsequent to the most recent lowering cycle, sending a signal to the lifting unit to carry out a lowering cycle of the work implement.

33. The method as defined in claim 32, wherein determining if the movement characteristic exceeds the threshold includes reading an output of at least one movement sensor to determine a speed of the tracked vehicle and comparing the speed to a threshold speed.

34. The method defined in claim 32, wherein determining if the movement characteristic exceeds the threshold includes reading an output of at least one movement sensor to determine an acceleration of the tracked vehicle and comparing the acceleration to a threshold acceleration.

35. The method defined in claim 32, the tracked vehicle comprising a pivotable connection that connects the at least part of the work implement to the frame and wherein the method further comprises controllably raising or lowering the work implement by angular movement about the pivotable connection.

36. The method defined in claim 32, wherein the lowering cycle of the work implement comprises lowering the work implement by an amount that is certain to put the work implement in a rest position.

37. The method defined in claim 36, wherein in the rest position, the work implement is incapable of being further lowered.

38. The method defined in claim 32, wherein sending the signal to the lifting unit to carry out the lowering cycle of the work implement comprises sending the signal to the lifting unit to lower the work implement by an amount that is certain to rest the work implement on the frame.

39. The method defined in claim 32, wherein sending the signal to the lifting unit to carry out the lowering cycle of the work implement comprises sending the signal to the lifting unit to lower the work implement by an amount that is certain to put the work implement in a rest position, without measuring a tilt angle of the work implement.

40. The method defined in claim 32, wherein sending the signal to the lifting unit to carry out the lowering cycle of the work implement comprises sending the signal to the lifting unit to lower the work implement in lowering increments separated by a pause.

41. The method defined in claim 32, wherein sending the signal to the lifting unit to carry out the lowering cycle of the work implement comprises sending the signal to the lifting unit to lower the work implement in angular or time increments, unless the work implement is already in a rest position.

42. The method defined in claim 32, wherein sending the signal to the lifting unit to carry out the lowering cycle of the work implement comprises sending the signal to the lifting unit to lower the work implement in angular or time increments separated by pauses.

43. The method defined in claim 42, wherein at least a size of the angular or time increments or a duration of the pauses is selectable by an operator of the tracked vehicle.

44. The method defined in claim 32, the signal being a first signal, the lowering cycle being a first lowering cycle, the method further comprising:
  sending the first signal to the lifting unit to carry out the first lowering cycle of the work implement in case the work implement is determined to be in a rest position, and
  sending a second signal to the lifting unit to carry out a second lowering cycle of the work implement in response to determining that the movement characteristic exceeds the threshold and that the input device has been actioned by the first type of external action subsequent to the most recent lowering cycle and the work implement is not in the rest position.

45. The method defined in claim 44, wherein the second lowering cycle lasts longer than the first lowering cycle.

46. The method defined in claim 32, further comprising recording instances of the lowering cycle of the work implement being carried out.

* * * * *